(12) United States Patent
Kim et al.

(10) Patent No.: US 11,318,816 B2
(45) Date of Patent: May 3, 2022

(54) HEAT PUMP SYSTEM FOR VEHICLE

(71) Applicants: Hyundai Motor Company, Seoul (KR); Kia Motors Corporation, Seoul (KR)

(72) Inventors: Jae Yeon Kim, Hwaseong-si (KR); Wan Je Cho, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/738,421

(22) Filed: Jan. 9, 2020

(65) Prior Publication Data

US 2021/0061067 A1    Mar. 4, 2021

(30) Foreign Application Priority Data

Sep. 2, 2019    (KR) .................. 10-2019-0107881

(51) Int. Cl.
*B60H 1/32*    (2006.01)
*B60H 1/00*    (2006.01)
*B60H 1/14*    (2006.01)

(52) U.S. Cl.
CPC ....... *B60H 1/3213* (2013.01); *B60H 1/00278* (2013.01); *B60H 1/00335* (2013.01); *B60H 1/143* (2013.01)

(58) Field of Classification Search
CPC .. B60H 1/3213; B60H 1/00335; B60H 1/143; B60H 1/00278; B60H 1/32281; B60H 2001/00949; B60H 1/00921; B60H 2001/00307; B60H 2001/00928; B60H 1/00885; B60H 1/00385

See application file for complete search history.

(56) References Cited

U.S. PATENT DOCUMENTS

| | | | |
|---|---|---|---|
| 6,047,770 A * | 4/2000 | Suzuki | B60L 1/003 165/202 |
| 6,347,528 B1 * | 2/2002 | Iritani | B60L 3/0046 62/324.6 |
| 8,215,432 B2 | 7/2012 | Nemesh et al. | |
| 8,899,062 B2 | 12/2014 | Kadle et al. | |
| 9,109,840 B2 | 8/2015 | Kadle et al. | |
| 9,239,193 B2 | 1/2016 | Kadle et al. | |
| 9,605,883 B2 * | 3/2017 | Katoh | F25B 6/04 |
| 9,873,307 B2 * | 1/2018 | Suzuki | F25B 6/04 |
| 9,944,151 B2 * | 4/2018 | Suzuki | F25B 41/20 |
| 9,951,973 B2 * | 4/2018 | Jojima | F25B 1/005 |

(Continued)

FOREIGN PATENT DOCUMENTS

| | | |
|---|---|---|
| CN | 103380339 B | 1/2016 |
| JP | 5336033 B2 | 11/2013 |

*Primary Examiner* — Ljiljana V. Ciric
(74) *Attorney, Agent, or Firm* — Morgan, Lewis & Bockius LLP

(57) ABSTRACT

A heat pump system for a vehicle may adjust a temperature of a battery module by use of one chiller that performs heat exchange between a refrigerant and a coolant, and improve heating efficiency by use of waste heat generated from an electrical component and the battery module, in increasing the flow rate of the refrigerant by operating the gas injection unit in the heating mode or the heating/dehumidification mode of the vehicle, thereby reducing power consumption of a compressor and maximizing heating performance.

20 Claims, 8 Drawing Sheets

(56) References Cited

U.S. PATENT DOCUMENTS

| | | | |
|---|---|---|---|
| 10,040,337 B2 * | 8/2018 | Miyakoshi | F25B 13/00 |
| 10,047,988 B2 * | 8/2018 | Miyakoshi | B60H 3/024 |
| 10,220,678 B2 * | 3/2019 | Miyakoshi | F25B 41/20 |
| 10,279,654 B2 * | 5/2019 | Miyakoshi | B60H 1/00764 |
| 10,391,836 B2 * | 8/2019 | Suzuki | B60H 1/00678 |
| 10,712,066 B2 * | 7/2020 | Miyakoshi | B60H 1/00921 |
| 10,737,552 B2 * | 8/2020 | He | F25B 30/02 |
| 10,814,692 B2 * | 10/2020 | Kim | B60H 1/3223 |
| 10,946,719 B2 * | 3/2021 | Suzuki | B60H 1/00385 |
| 2013/0283838 A1 | 10/2013 | Kadle et al. | |
| 2014/0318170 A1 * | 10/2014 | Katoh | F25B 5/04 |
| | | | 62/324.5 |
| 2015/0000331 A1 * | 1/2015 | Jojima | F25B 41/20 |
| | | | 62/498 |
| 2015/0027162 A1 * | 1/2015 | Ohno | B60H 1/00899 |
| | | | 62/525 |
| 2016/0082810 A1 * | 3/2016 | Suzuki | F25B 41/20 |
| | | | 62/151 |
| 2016/0116197 A1 * | 4/2016 | Takeuchi | F25B 5/04 |
| | | | 62/276 |
| 2016/0185186 A1 * | 6/2016 | Miyakoshi | B60H 1/3213 |
| | | | 62/160 |
| 2016/0201959 A1 * | 7/2016 | Miyakoshi | F25B 31/008 |
| | | | 62/155 |
| 2016/0201960 A1 * | 7/2016 | Miyakoshi | F25B 49/02 |
| | | | 62/154 |
| 2016/0201961 A1 * | 7/2016 | Miyakoshi | F25B 47/022 |
| | | | 62/133 |
| 2016/0236538 A1 * | 8/2016 | Suzuki | F25B 5/04 |
| 2016/0236539 A1 * | 8/2016 | Suzuki | B60H 1/2221 |
| 2018/0209708 A1 * | 7/2018 | Miyakoshi | B60H 1/00385 |
| 2018/0236845 A1 * | 8/2018 | Miyakoshi | B60H 1/00921 |
| 2019/0232757 A1 * | 8/2019 | Suzuki | B60H 1/2221 |
| 2019/0241044 A1 * | 8/2019 | Ito | B60H 1/00392 |
| 2020/0039323 A1 * | 2/2020 | He | B60H 1/00899 |
| 2020/0180391 A1 * | 6/2020 | Kim | B60H 1/32284 |
| 2020/0247215 A1 * | 8/2020 | Kozasa | F28D 1/0461 |
| 2021/0016628 A1 * | 1/2021 | Kozasa | B60H 1/00342 |
| 2021/0039474 A1 * | 2/2021 | Kim | B60H 1/00899 |
| 2021/0061067 A1 * | 3/2021 | Kim | B60H 1/00335 |

* cited by examiner

HEAT PUMP SYSTEM FOR VEHICLE

CROSS-REFERENCE TO RELATED APPLICATION

The present application claims priority to Korean Patent Application No. 10-2019-0107881 filed on Sep. 2, 2019, the entire contents of which is incorporated herein for all purposes by this reference.

BACKGROUND OF THE INVENTION

Field of the Invention

The present invention relates to a heat pump system for a vehicle. More particularly, the present invention relates to a heat pump system for a vehicle which adjusts a temperature of a battery module by use of one chiller that performs heat exchange between a refrigerant and a coolant and improves heating efficiency by use of waste heat generated from an electrical component.

Description of Related Art

In general, an air conditioner for a vehicle includes an air conditioning system for circulating a coolant to heat or cool an interior of the vehicle.

Such an air conditioner maintains a comfortable indoor environment by maintaining an internal temperature of the vehicle at an appropriate level regardless of an external temperature change, so that the interior of the vehicle is warmed or cooled through heat exchange by a condenser and an evaporator during a process in which a refrigerant discharged by driving of a compressor circulates back to the compressor after passing through a condenser, a receiver dryer, an expansion valve, and an evaporator.

That is, the air conditioner system condenses a gaseous coolant of a high temperature and a high pressure compressed by the compressor in a cooling mode in the summer to reduce a temperature and humidity of the interior of the vehicle through evaporation in the evaporator through the receiver dryer and the expansion valve.

Meanwhile, in recent years, as interest in energy efficiency and environmental pollution has been increasing, there has been a demand for the development of environmentally friendly vehicles configured for substantially replacing internal combustion engine vehicles. The environmentally friendly vehicles are usually fuel cell or electric vehicles driven by electricity or a hybrid vehicle driven by an engine and a battery.

Among the environmentally friendly vehicles, the electric vehicle or the hybrid vehicle does not use a separate heater, unlike an air conditioner of a general vehicle, and the air conditioner applied to the environmentally friendly vehicle is referred to as a heat pump system.

On the other hand, in the case of the electric vehicle, chemical reaction energy of oxygen and hydrogen is converted into electrical energy to generate driving force. In the present process, since thermal energy is generated by the chemical reaction in the fuel cell, effectively removing the generated heat is essential in securing performance of the fuel cell.

Furthermore, even in the hybrid vehicle, a motor is driven by use of the electricity supplied from the fuel cell or an electric battery together with an engine that operates by general fuel to generate the driving force, and as a result, the performance of the motor may be secured only by effectively removing the heat generated from the fuel cell or the battery and the motor.

As a result, in the hybrid vehicle or the electric vehicle A battery cooling system needs to be separately formed with a separate sealing circuit together with a cooler and the heat pump system to prevent the heat generation in the motor and electrical components, and the battery including the fuel cell.

Accordingly, the size and weight of a cooling module mounted in the front of the vehicle increase and a layout of connection pipes that supply the refrigerant and the coolant to the heat pump system, the cooler, and the battery cooling system is complicated in an engine compartment.

Furthermore, the battery cooling system which heats or cools the battery according to a status of the vehicle for the battery to show optimal performance is separately provided, and as a result, multiple valves for connection with the respective connection pipes are adopted and noise and vibration due to frequent opening/closing operations of the valves are transferred to the interior of the vehicle to degrade ride comfort.

Furthermore, when heating the vehicle interior, there are drawbacks that the heating performance deteriorates due to the lack of a heat source, the electricity consumption is increased by the use of the electric heater, and the power consumption of the compressor is increased.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a heat pump system for a vehicle, which adjusts a temperature of a battery module by use of one chiller that performs heat exchange between a refrigerant and a coolant and improves heating efficiency by use of waste heat generated from an electrical component and the battery module.

Various aspects of the present invention are directed to providing a heat pump system for a vehicle increases the flow rate of the refrigerant by applying the gas injection unit operates in the heating mode or the heating/dehumidification mode of the vehicle, reducing power consumption of a compressor and maximizing heating performance.

Various aspects of the present invention are directed to providing the heat pump system for the vehicle, including: a cooling apparatus configured to include a radiator, a first water pump, a first valve, and a reservoir tank which are connected through a coolant line, and configured to circulate a coolant in the coolant line to cool at least one electrical component provided in the coolant line; a battery cooling apparatus configured to include a battery coolant line connected to the reservoir tank through a second valve, and a second water pump and a battery module which are connected through the battery coolant line to circulate the coolant in the battery module; a heating apparatus including a heating line connected to the coolant line through a third valve to heat a vehicle interior by use of a coolant and a third water pump provided on the heating line, and a heater; a chiller provided in a branch line which is connected to the battery coolant line through the second valve, and connected to a refrigerant line of an air conditioner through a refrigerant connection line, to adjust a temperature of the coolant by performing heat exchange between the coolant which is selectively introduced into a connection line connecting the coolant line and the branch line through the first valve, and the branch line and a refrigerant which is selectively supplied from the air conditioner; and a gas injection unit provided in the air conditioner and bypassing a portion of the refrigerant among the refrigerant passing through the condenser connected to the heating line to the compressor to increase a flow rate of the refrigerant circulating through the refrigerant line.

A first end portion of the connection line may be connected to the coolant line through the first valve and a second end portion of the connection line may be connected to the branch line between the second valve and the chiller, and the heater may be provided inside a heating, ventilation, and air conditioning (HVAC) module included in the air conditioner.

When the battery module is heated, the connection line may be open in a state in which the coolant line connected to the radiator is closed through operation of the first valve, the branch line may be open through an operation of the second valve, a portion of the battery coolant line connected to the reservoir tank may be closed based on the branch line, the coolant may circulate along the battery coolant line and the branch line through an operation of the second water pump, in the heating apparatus, the coolant line and the heating line may be connected through operation of the third valve, in the cooling apparatus, the coolant with the temperature increased by the waste heat of the electrical component may circulate through the heating line through operation of the third water pump, and a high-temperature coolant introduced from the heating line and the coolant line may be flowed into the branch line from the coolant line through the connection line, and may be supplied to the battery module connected through the battery coolant line and the branch line.

The air conditioner may include: a heating, ventilation, and air conditioning (HVAC) module configured to include an evaporator which is connected thereto through the refrigerant line and an opening and closing door configured to control outside air passing through the evaporator to be selectively introduced into the heater depending on cooling, heating, and heating/dehumidifying modes of the vehicle therein; the condenser connected to the heating line to circulate a coolant therein to perform heat exchange between the coolant and a refrigerant supplied through the refrigerant line; a compressor connected between the evaporator and the condenser through the refrigerant line; a heat exchanger provided on the refrigerant line between the condenser and the evaporator; a first expansion valve provided in the refrigerant line between the heat exchanger and the evaporator; a second expansion valve provided in the refrigerant connection line; an accumulator provided in the refrigerant line between the evaporator and the compressor and connected to the refrigerant connection line; and a third expansion valve provided in the refrigerant line between the condenser and the heat exchanger.

The heat exchanger may additionally condense or evaporate the refrigerant condensed in the condenser through heat exchange with the outside air depending on the selective operation of the third expansion valve.

The second expansion valve may expand the refrigerant inflowed through the refrigerant connection line to flow to the chiller when the battery module is cooled by use of the coolant heat-exchanged with the refrigerant.

The third expansion valve may selectively expand the refrigerant inflowed to the heat exchanger in a heating mode and a heating/dehumidification mode of the vehicle.

The gas injection unit may include: a plate-type heat exchanger provided on the refrigerant line between the condenser and the heat exchanger; a bypass line having one end portion connected to the refrigerant line between the condenser and the plate-type heat exchanger, and the other end portion connected to the compressor by passing through the plate-type heat exchanger; and the fourth expansion valve provided on the bypass line at the front of the plate-type heat exchanger.

The fourth expansion valve may expand the refrigerant inflowed to the bypass line through the condenser in the heating mode or the heating/dehumidification mode of the vehicle.

The gas injection unit may include: a flash tank provided on the refrigerant line between the condenser and the heat exchanger and dividing the refrigerant passing through the condenser into a gaseous refrigerant and a liquid refrigerant to be selectively exhausted; a bypass line connecting the flash tank and the compressor, and selectively suppling the refrigerant of the gaseous state from the flash tank to the compressor; a bypass valve provided on the bypass line; and a fourth expansion valve provided on the refrigerant line between the condenser and the flash tank.

The fourth expansion valve may expand the refrigerant passing through the condenser in a heating mode or heating/dehumidification mode of the vehicle.

The HVAC module may further include an air heater provided at an opposite side of the evaporator, with the heater interposed therebetween to selectively heat outside air passing through the heater, and the air heater may be operated to raise a temperature of the outside air passing through the heater when a temperature of a coolant supplied to the heater is lower than a target temperature for internal heating.

When the battery module is cooled in the cooling mode of the vehicle, the coolant may circulate through the coolant line by operation of the first water pump in the cooling apparatus; the connection line may be closed through an operation of the first valve; in the battery cooling apparatus, the branch line may be open through an operation of the second valve, and the coolant passing through the chiller through operation of the second water pump may be supplied to the battery module along the battery coolant line and the branch line in a state where the battery coolant line connected to the reservoir tank based on the branch line is closed; in the heating apparatus, the coolant line and the heating line may be connected through operation of the third valve so that the coolant is supplied from the cooling apparatus; in the air conditioner, in a state that the refrigerant connection line is open through operation of the second expansion valve, the refrigerant may circulate along the refrigerant line and the refrigerant connection line; the first and second expansion valves may expand the refrigerant so that the expanded refrigerant is respectively supplied to the evaporator and the chiller; the third expansion valve may inflow the refrigerant supplied from the condenser to the heat exchanger; and the gas injection unit may be deactivated.

The heating apparatus may supply the coolant supplied from the cooling apparatus through operation of the third water pump to the condenser, and the condenser may condense the refrigerant through heat exchange with the coolant, and the heat exchanger additionally condenses the refrigerant inflowed from the condenser through heat exchange with the outside air.

When recovering the waste heat of the external heat source, the electrical component, and the battery module in a heating mode of the vehicle, the connection line may be open through and operation of the first valve; in the cooling apparatus, on the basis of the connection line, a portion of the coolant line connected to the radiator and a portion of the coolant line connecting the radiator and the reservoir tank may be closed through operation of the first valve V1, and in the instant state, the coolant passing through the electrical component may be supplied to the chiller along the open connection line without passage through the radiator through operation of the first water pump; in the battery cooling apparatus, the branch line and the battery coolant line may be open through operation of the second valve, respectively, and the coolant passing through the battery module may be supplied to the chiller along the branch line through operation of the second water pump; the coolant line and the heating line respectively may form an independent closed circuit through operation of the third valve; in the heating apparatus, the coolant may circulate along the heating line through operation of the third water pump; in the air conditioner, the refrigerant line connecting the condenser and the evaporator may be closed through operation of the first expansion valve; the refrigerant connection line may be open through operation of the second expansion valve; the second expansion valve may expand the refrigerant supplied to the refrigerant connection line to be supplied to the chiller; the third expansion valve may expand the refrigerant supplied from the condenser to be supplied to the heat exchanger; and the gas injection unit may be operated.

In a heating/dehumidification mode of the vehicle, the connection line may be open through an operation of the first valve; in the cooling apparatus, on the basis of the connection line, a portion of the coolant line connected to the radiator and a portion of the coolant line connecting the radiator and the reservoir tank may be closed through operation of the first valve V1, and in the instant state, the coolant passing through the electrical component may be supplied to the chiller along the open connection line without passage through the radiator through operation of the first water pump; in the battery cooling apparatus, the branch line may be open through an operation of the second valve to close the battery coolant line other than a portion of the battery coolant line connected to the reservoir tank with respect to the branch line; the coolant discharged from the chiller may be introduced into the reservoir tank through the branch line and the open the battery coolant line; the coolant line and the heating line respectively may form an independent closed circuit through operation of the third valve; in the heating apparatus, the coolant may circulate along the heating line through operation of the third water pump; in the air conditioner, the refrigerant may be circulated along the refrigerant line and the refrigerant connection line open through operation of the first and second expansion valves, respectively; the first and second expansion valves may expand the refrigerant so that the expanded refrigerant is respectively supplied to the evaporator and the chiller and the gas injection unit may be operated.

When cooling the electrical component and the battery module by use of the coolant, the connection line and the branch line may be closed through operation of the first and second valves, the coolant, which is cooled in the radiator and stored in the reservoir tank, may be supplied to the electrical component through operation of the first water pump, and the coolant stored in the reservoir tank may be circulated in the battery coolant line connected to the reservoir tank through operation of the second valve to be supplied to the battery module.

When using the waste heat of the electrical equipment in the heating mode of the vehicle without the operation of the air conditioner, the connection line may be open through an operation of the first valve; in the cooling apparatus, on the basis of the connection line, a portion of the coolant line connected to the radiator and a portion of the coolant line connecting the radiator and the reservoir tank may be closed; the branch line may be open through an operation of the second valve to close the battery coolant line other than a portion of the battery coolant line connected to the reservoir tank with respect to the branch line; the coolant whose the temperature is increased while passing through the electrical component by the operation of the first water pump may be supplied to the heater along the heating line connected through the third valve without passing through the radiator; the coolant discharged from the heater may be supplied into the chiller along the heating line, the third valve, the coolant line, the connection line, and the branch line; and the coolant discharged from the chiller may be introduced into the reservoir tank through the branch line and the opened battery coolant line.

The first valve may open the coolant line connected to the radiator to allow some of the coolant passing through the electrical component to flow into the connection line and the remaining coolant to flow into the radiator when the electrical component is overheated.

The gas injection unit may be operated in the heating mode or the heating/dehumidification mode of the vehicle.

A described above, according to the heat pump system for the vehicle according to an exemplary embodiment of the present invention, the temperature of the battery module may be adjusted depending on the mode of the vehicle by use of one chiller for performing heat exchange between the coolant and the refrigerant, and the interior of the vehicle may be heated by use of the coolant, simplifying the entire system.

According to an exemplary embodiment of the present invention, it is also possible to improve the heating efficiency by recovering waste heat from the electrical component and using it for internal heating.

Furthermore, according to an exemplary embodiment of the present invention, it is possible to optimize the performance of the battery module by efficiently controlling the temperature of the battery module, and increase an overall travel distance of the vehicle through efficient management of the battery module.

Furthermore, according to an exemplary embodiment of the present invention can use the coolant heater applied to the heating apparatus may be used to heat the battery module or to assist in an internal heating of the vehicle, reducing the cost and weight.

Furthermore, according to an exemplary embodiment of the present invention, heat of outside air, and waste heat of an electrical component, and a battery module is selectively used in a heating mode of the vehicle, enhancing heating efficiency.

Furthermore, according to an exemplary embodiment of the present invention may improve the cooling performance and reducing power consumption of a compressor by increasing condensation or evaporation performance of the refrigerant using a condenser and a heat exchanger.

Furthermore, according to an exemplary embodiment of the present invention may maximize the heating performance by applying the gas injection unit to increase the flow rate of the refrigerant in the heating mode, or heating/dehumidification mode.

Furthermore, according to an exemplary embodiment of the present invention, manufacturing cost may be reduced and a weight may be reduced through simplification of an entire system, and spatial utilization may be enhanced.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
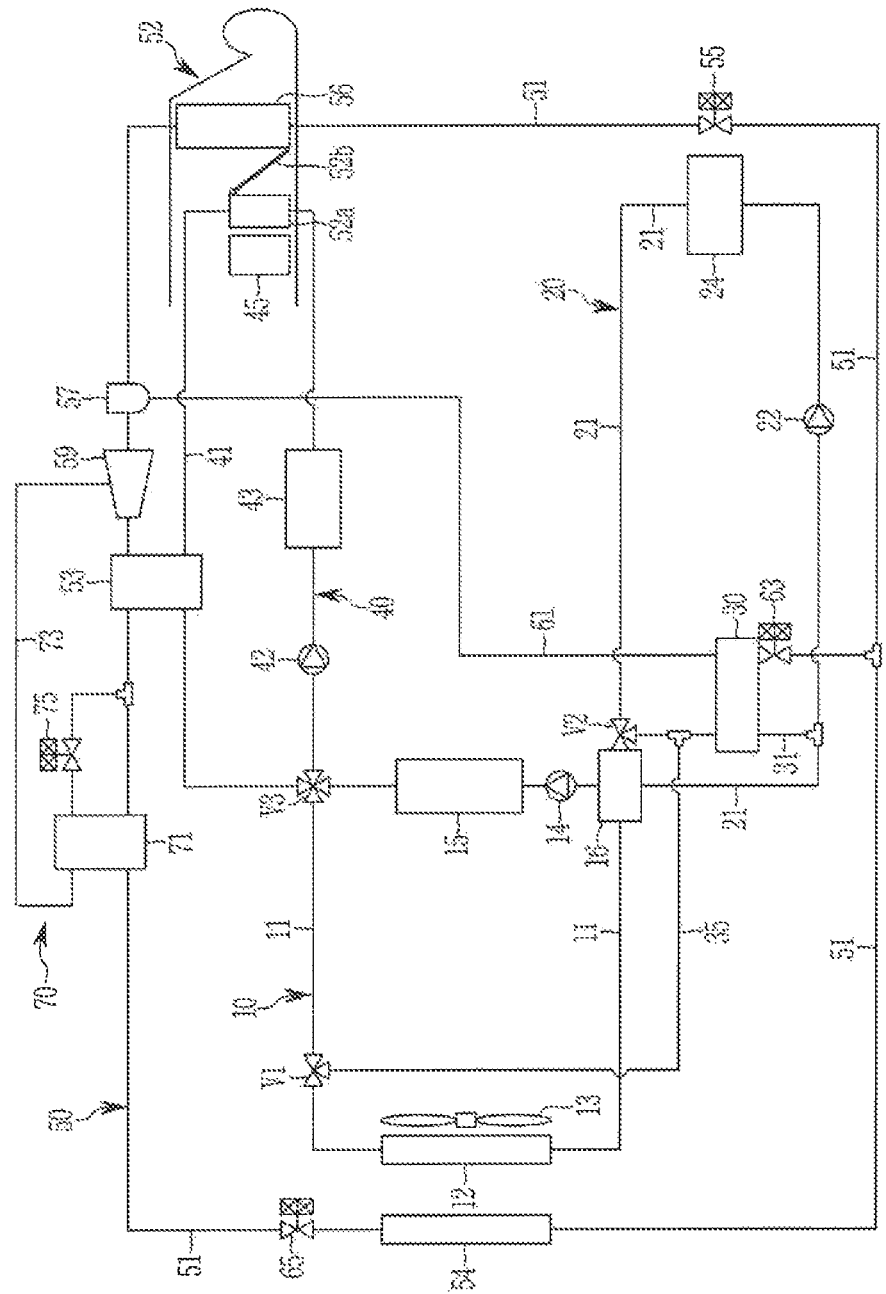
FIG. 1 illustrates a block diagram of a heat pump system for a vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

An exemplary embodiment of the present invention will hereinafter be described in detail with reference to the accompanying drawings.

Exemplary embodiments described in the exemplary embodiment and configurations shown in the drawings are just the most preferable exemplary embodiments of the present invention, but do not limit the spirit and scope of the present invention. Therefore, it should be understood that there may be various equivalents and modifications capable of replacing them at the time of filing of the present application.

To clarify the present invention, portions that are not connected with the description will be omitted, and the same elements or equivalents are referred to by the same reference numerals throughout the specification.

The size and thickness of each element are arbitrarily shown in the drawings, but the present invention is not necessarily limited thereto, and in the drawings, the thickness of layers, films, panels, regions, etc., are exaggerated for clarity.

Throughout the present specification and the claims which follow, unless explicitly described to the contrary, the word "comprise" or variations such as "comprises" or "comprising" will be understood to imply the inclusion of stated elements but not the exclusion of any other elements.

Furthermore, the terms, " . . . unit", " . . . mechanism", " . . . portion", " . . . member", etc. used herein mean a unit of inclusive components performing at least one or more functions or operations.

FIG. 1 is a block diagram of a heat pump system for a vehicle according to an exemplary embodiment of the present invention.

The heat pump system for the vehicle according to an exemplary embodiment of the present invention may adjust a temperature of a battery module 24 by use of one chiller 30 in which a refrigerant and a coolant are heat-exchanged. Furthermore, the heat pump system for the vehicle according to an exemplary embodiment of the present invention may use waste heat of an electrical component 15 and a battery module 24 and a gas injection unit 70, improving heating efficiency.

Here, in the heat pump system for the electric vehicle, a cooling apparatus 10 for cooling the electrical component 15, a battery cooling apparatus 20 for cooling the battery module 24, a heating apparatus 40 heating an interior by using a coolant, and an air conditioner 50 which is an air conditioning apparatus configured for cooling the interior may be mutually interconnected.

That is, referring to FIG. 1, the heat pump system includes the cooling apparatus 10, the battery cooling apparatus 20, the chiller 30, and the heating apparatus 40.

First, the cooling apparatus 10 includes a radiator 12 connected to a coolant line 11, a first water pump 14, a first valve V1, and a reservoir tank 16.

The radiator 12 is mounted in the front of the vehicle, and a cooling fan 13 is mounted behind the radiator 12, so that the coolant is cooled through an operation of the cooling fan 13 and heat exchange with the outside air.

Furthermore, the electrical component 15 may include an electric power control unit (EPCU), a motor, an inverter, or an on board charger (OBC).

The electrical component 15 configured as described above may be provided in the coolant line 11 to be cooled in a water-cooled manner.

Accordingly, when the waste heat of the electrical component 15 is recovered in the heating mode of the vehicle, the heat generated from the EPCU, the motor, the inverter, or the OBC may be recovered.

The cooling apparatus 10 may circulate the coolant in the coolant line 11 such that the coolant is supplied to the electrical component 15 provided in the coolant line 11.

The battery cooling apparatus 20 includes a battery coolant line 21 connected to the reservoir tank 16 through a second valve V2 and a second water pump 22 connected to the battery coolant line 21, and the battery module 24.

The battery cooling apparatus 20 may selectively circulate the coolant in the battery module 24 through an operation of the second water pump 22.

Meanwhile, the battery module 24 may be formed as a water-cooled type that supplies power to the electrical component 15, and is cooled by a coolant flowing along the battery coolant line 31.

Herein, the first water pump 14 and the second water pump 22 may each be an electric water pump.

In the exemplary embodiment of the present invention, the chiller 30 is provided in a branch line 31 connected to the battery coolant line 21 through the second valve V2.

The chiller 30 is connected to a refrigerant line 51 of an air conditioner 50 through a refrigerant connection line 61. That is, the chiller 30 may be a water-cooled heat exchanger into which a coolant flows.

Accordingly, the chiller 30 is selectively connectable to the connection line 35 connecting the coolant line 11 and the branch line 31 through the first valve V1 and to the branch line 31. The chiller 30 may regulate the temperature of the coolant by performing heat exchange between the coolant and the refrigerant which is selectively supplied from the air conditioner 50.

A first end portion of the connection line 35 may be connected to the coolant line 11 via the first valve V1. A second end portion of the connection line 35 may be connected to the branch line 31 between the second valve V2 and the chiller 30.

The connection line 35 may be selectively opened or closed according to the operation of the first valve V1 and the first water pumps 14. Furthermore, the connection line 35 may connect the coolant line 11 and the branch line 31 according to the operation of the first valve V1.

Also, the heating apparatus 40 may include a heating line 41 connected to the coolant line 11 through a third valve V3, and a third water pump 42 and a heater 52a provided in the heating line 41 to supply the coolant having the temperature which is increased while it passes through the electrical component 15 thereto.

The heater 52a may be provided inside a heating, ventilation, and air conditioning (HVAC) module 52 included in the air conditioner 50.

Here, a coolant heater 43 to selectively heat the coolant circulating in the heating line 41 may be provided in the heating line 41 between the third water pump 42 and the heater 52a.

The coolant heater 43 is ON-operated when the temperature of the coolant supplied to the heater 52a in the heating mode of the vehicle is lower than a target temperature to heat the coolant circulated in the heating line 41, inflowing the coolant of which the temperature is increased to the heater 52a.

The coolant heater 43 may be an electric eater that operates according to the power supply.

On the other hand, in the exemplary embodiment of the present invention, it is described that the coolant heater 43 is provided in the heating line 41, however it is not limited thereto, and an air heater 45 to increase the temperature of the outside air inflowing to the interior of the vehicle may be applied instead of the coolant heater 43.

The air heater 45 may be mounted on the rear of the heater 52a toward the interior of the vehicle inside the HVAC module 52 to selectively heat the outside air passing through the heater 52a.

That is, the heating apparatus 40 may be applied to one of the coolant heater 43 and the air heater 45.

The heating apparatus 40 constructed as described above supplies the high temperature coolant inflowed from the cooling apparatus 10 to the heating line 41 in the heating mode of the vehicle or the coolant of which the temperature is increased while circulating through the heating line 41 to the heater 52a through operation of the third water pump 42, heating the vehicle interior.

Here, the first, second, and third water pumps 14, 26, and 42 may be electric water pumps.

In the exemplary embodiment of the present invention, the air conditioner 50 includes the HVAC module 52, a condenser 53, a heat exchanger 54, a first expansion valve 55, an evaporator 56, and a compressor 59 which are connected through the refrigerant line 51.

First, the HVAC module 52 includes the evaporator 56 connected therewith through the refrigerant line 51, and an opening and closing door 52b for controlling the outside air passing through the evaporator 56 to be selectively introduced into the heater 52a depending on cooling, heating, and heating/dehumidifying modes of the vehicle therein.

That is, the opening and closing door 52b is opened to allow the outside air passing through the evaporator 56 to be introduced into the heater 52a in the heating mode of the vehicle. In contrast, in the cooling mode of the vehicle, the opening and closing door 52b closes off the heater 52a such that the outside air which is cooled while passing through the evaporator 56 directly flows into the vehicle.

Here, when the coolant heater 43 is not provided in the heating apparatus 40, the air heater 45 provided in the HVAC module 52 may be provided at an opposite side of the evaporator 56 with the heater 52a interposed therebetween.

The air heater 45 may be operated to raise the temperature of the outside air passing through the heater 52a when the temperature of the coolant supplied to the heater 52a is lower than a target temperature for internal heating.

On the other hand, the air heater 45 may be provided inside the HVAC module 52 when the coolant heater 43 is not provided in the heating line 41.

That is, in the heat pump system according to an exemplary embodiment of the present invention, only one of the coolant heater 43 and the air heater 45 may be applied.

In the exemplary embodiment of the present invention, the condenser 53 is connected to the refrigerant line 51 to allow the refrigerant to pass therethrough, and is connected to the heating line 41 to allow the coolant circulating through the heating apparatus 40 to pass therethrough.

This condenser 53 may condense the refrigerant through heat exchange with the coolant supplied through the heat line 41. In other words, the condenser 53 may be a water-cooled heat exchanger into which the coolant flows.

The condenser 53 configured as described above may perform heat exchange between the refrigerant supplied from the compressor 59 and the coolant supplied from the heating apparatus 40 to condense the refrigerant.

In the exemplary embodiment of the present invention, the heat exchanger 54 may be provided in the refrigerant line 51 between the condenser 53 and the evaporator 56.

The first expansion valve 55 is provided in the refrigerant line 51 between the heat exchanger 54 and the evaporator 56. The first expansion valve 55 receives the refrigerant passing through the heat exchanger 54 to expand it.

The accumulator 57 is provided in the refrigerant line 51 between the evaporator 56 and the compressor 59 and is connected to the refrigerant connection line 61.

Such an accumulator 57 improves the efficiency and durability of the compressor 59 by supplying only the gaseous refrigerant to the compressor 59.

In the exemplary embodiment of the present invention, the first end portion of the refrigerant connection line 61 is connected to the refrigerant line 51 between the heat exchanger 54 and the first expansion valve 55. The second end portion of the refrigerant connection line 61 may be connected to the accumulator 57.

Here, the accumulator 55 may supply the gaseous refrigerant of the refrigerant supplied through the refrigerant connection line 61 to the compressor 59.

On the other hand, the refrigerant connection line 61 is provided with a second expansion valve 63, and the refrigerant line 51 between the condenser 53 and the heat exchanger 54 may be provided with a third expansion valve 65.

The second expansion valve 63 may expand the coolant inflowed through the refrigerant connection line 61 to inflow to the chiller 30 when cooling the battery module 24 with the refrigerant.

Here, the second expansion valve 63 is operated when recovering the waste heat of the electrical component 15, or the battery module 26, in the heating mode and heating/dehumidification mode of the vehicle.

The second expansion valve 63 may selectively expand the refrigerant introduced through the refrigerant connection line 61 to inflow the chiller 30.

That is, the second expansion valve 63 expands the refrigerant discharged from the heat exchanger 54 and flowing into the chiller 30 while lowering the temperature of the refrigerant, the temperature of the coolant may be further lowered.

As a result, the battery module 24 may be cooled more efficiently by inflowing the coolant having the lower temperature while passing through the chiller 30.

The third expansion valve 65 may selectively expand the coolant which is inflowed to the heat exchanger 54 in the heating mode and the heating/dehumidification mode of the vehicle.

Here, the heat exchanger 54 may further condense or evaporate the refrigerant condensed from the condenser 53 through heat exchange with the outside air, depending on the selective operation of the third expansion valve 65.

In other words, the heat exchanger 54 is mounted in the front of the radiator 12 to mutually heat-exchange the coolant that has been inflowed therein with the outside air.

Meanwhile, when the heat exchanger 54 condenses the refrigerant, the heat exchanger 54 may increase sub-cooling of the refrigerant by further condensing the refrigerant condensed at the condenser 53, improving a COP (Coefficient Of Performance), which is a coefficient of cooling capacity versus power required by the compressor.

The compressor 59 is connected via the refrigerant line 51 between the evaporator 58 and the condenser 53. The present compressor 59 may compress the refrigerant in the gaseous state and supply the compressed refrigerant to the condenser 53.

Meanwhile, in the exemplary embodiment of the present invention, the heat pump system may further include the gas injection unit 70.

The gas injection unit 70 is provided in the air conditioner 50. The gas injection unit 70 bypasses some of the refrigerant among the refrigerant passing through the condenser 53 to the compressor 59, increasing the flow rate of the refrigerant circulating through the refrigerant line 51.

The gas injection unit 70 configured as described above may operate in the heating mode and the heating/dehumidification mode of the vehicle.

On the other hand, the gas injection unit 70 may be deactivated in the cooling mode of the vehicle.

Here, the gas injection unit 70 may include a plate-type heat exchanger 71, a bypass line 73, and a fourth expansion valve 75.

First, the plate-type heat exchanger 71 may be provided on the refrigerant line 51 between the condenser 53 and the heat exchanger 54.

One end portion of the bypass line 73 is connected to the refrigerant line 51 between the condenser 53 and the plate-type heat exchanger 71. The other end portion of the bypass line 73 may be connected to the compressor 59 by passing through the plate-type heat exchanger 71.

That is, portion of the refrigerant passing through the condenser 53 may inflow to the bypass line 73 and the remainder of the refrigerant may inflow to the plate-type heat exchanger 71 through the refrigerant line 51.

Also, the fourth expansion valve 75 may be provided on the bypass line 73 at the front of the plate-type heat exchanger 71.

The fourth expansion valve 75 may expand the refrigerant inflowed to the bypass line 73 passing through the condenser 53 in the heating mode and the heating/dehumidification mode of the vehicle to be supplied to the plate-type heat exchanger 71.

Accordingly, the plate-type heat exchanger 71 may mutually heat-exchange the refrigerants which is introduced into the bypass line 73 and expanded through operation of the fourth expansion valve 75, and the refrigerant discharged from the condenser 53.

That is, the bypass line 73 may selectively supply the refrigerant of the gaseous state to the compressor 59 among the refrigerant which undergoes heat transfer while passing through the plate-type heat exchanger 71.

In the gas injection unit 70 configured as described above, some of the refrigerant passing through the condenser 53 flow into the bypass line 73.

The refrigerant inflowed to the bypass line 73 is expanded through operation of the fourth expansion valve 75, and the expanded refrigerant enters the gaseous state in the plate-type heat exchanger 71 by heat-exchanging with the remaining refrigerant inflowed through the refrigerant line 51 from the condenser 53.

The refrigerant of the gaseous state is supplied to the compressor 59 through the open bypass line 73.

That is, the gas injection unit 70 again inflows the refrigerant of the gas state, which undergoes heat transfer while passing through the plate-type heat exchanger 71 to the compressor 59 through the bypass line 73, increasing the flow rate of the refrigerant circulating through the refrigerant line 51.

In an exemplary embodiment of the present invention, a controller is connected to at least one of the elements of the heat pump system, to control the operations thereof.

In addition, the term "controller" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention.

Meanwhile, a gas injection unit 170 according to various exemplary embodiments of the present invention will be described with reference to FIG. 2.

Figure 2:
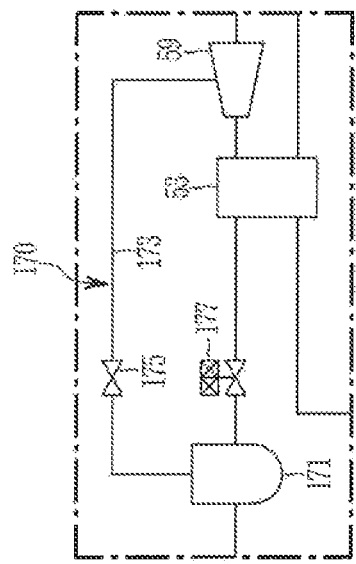
FIG. 2 illustrates a block diagram of a gas injection unit applied to a heat pump system for a vehicle according to various exemplary embodiments of the present invention.

FIG. 2 illustrates a block diagram of a gas injection unit applied to a heat pump system for a vehicle according to various exemplary embodiments of the present invention.

Referring to FIG. 2, the gas injection unit 170 according to various exemplary embodiments of the present invention is provided in the air conditioner 50.

The gas injection unit 170 bypasses some of the refrigerant among the refrigerant passing through the condenser 53 to the compressor 59, increasing the flow rate of the refrigerant circulating through the refrigerant line 51.

The gas injection unit 170 configured as described above may operate in the heating mode and the heating/dehumidification mode of the vehicle.

On the other hand, the gas injection unit 170 may be deactivated in the cooling mode of the vehicle.

Here, the gas injection unit 170 includes a flash tank 171, a bypass line 173, a bypass valve 175, and a fourth expansion valve 177.

First, the flash tank 171 may be provided on the refrigerant line 51 between the condenser 53 and the heat exchanger 54.

The flash tank 171 may divide the gaseous refrigerant and the liquid refrigerant among the refrigerant in which heat exchanged is completed while passing through the condensers 53 to be selectively exhausted.

The bypass line 173 connects the flash tank 171 and the compressor 59. The bypass line 173 may selectively supply the refrigerant of the gaseous state from the flash tank 171 to the compressor 59.

That is, the bypass line 173 may connect the flash tank 171 and the compressor 59 so that the gaseous refrigerant passing through the flash tank 171 selectively inflows to the compressor 59.

In the exemplary embodiment of the present invention, the bypass valve 175 is provided on the bypass line 173. The bypass valve 175 may selectively open the bypass line 173 according to the mode of the vehicle.

Here, the flash tank 171 may supply the gaseous refrigerant to the compressor 59 through the bypass line 173 which is opened through operation of the bypass valve 175. Also, the flash tank 171 may supply the liquid refrigerant to the heat exchanger 54.

Furthermore, the fourth expansion valve 177 may be provided on the refrigerant line 51 between the condenser 53 and the flash tank 171.

Here, the fourth expansion valve 177 may expand the refrigerant passing through the condenser 53 in the heating mode and the heating/dehumidification mode of the vehicle to be supplied to the flash tank 171.

In the exemplary embodiment of the present invention, the first, second, and third expansion valve 55, 63, and 65, and the fourth expansion valve 75 or 177 may be electronic expansion valves that selectively expand the refrigerant while controlling the flow of the refrigerant passing through the refrigerant line 51 or the refrigerant connection line 61 or the bypass line 73 or 173.

Also, the first and second valves V1 and V2 may three-way valves which may distribute the flow, and the third valve V3 may be a four-way valve.

Hereinafter, the operation and action of the heat pump system for the vehicle according to an exemplary embodiment of the present invention is described with reference to FIG. 3 to FIG. 8 in detail.

First, the operation of the heat pump system for the vehicle according to an exemplary embodiment of the present invention is described with reference to FIG. 3 when cooling the electrical component 15 and the battery module 24 by use of the coolant.

Figure 3:
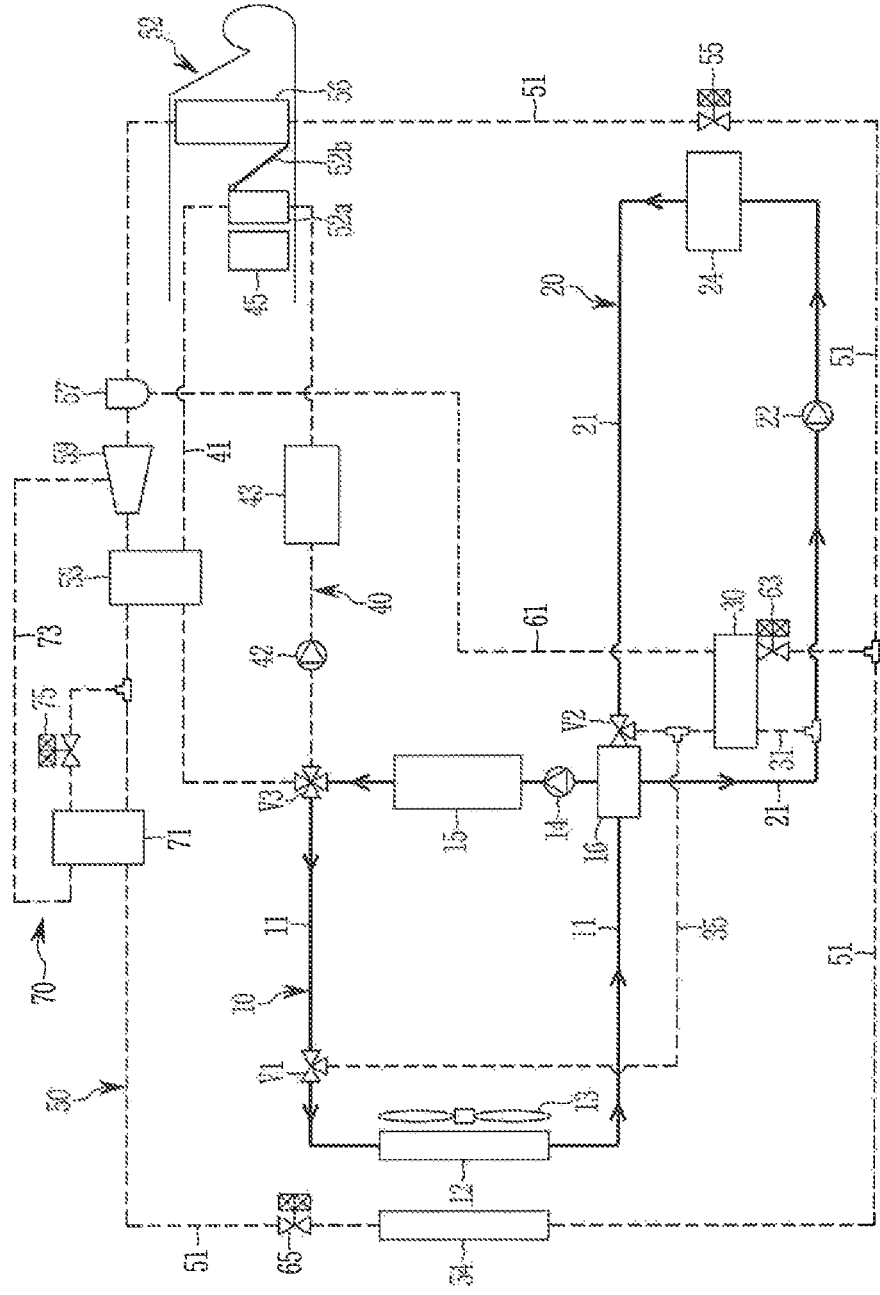
FIG. 3 illustrates an operational state diagram for cooling an electrical component and a battery module using a coolant in the heat pump system for a vehicle according to an exemplary embodiment of the present invention.

FIG. 3 illustrates an operational state diagram for cooling an electrical component and a battery module using a coolant in the heat pump system for a vehicle according to an exemplary embodiment of the present invention.

Referring to FIG. 3, the branch line 31 and the connection line 35 are closed through operations of the first and second valves V1 and V2.

Furthermore, the battery coolant line 21 is connected to the reservoir tank 16 through operation of the second valve V2.

In the present state, in the cooling apparatus 10, the first water pump 14 is operated to cool the electrical component 15. Accordingly, the coolant which is cooled in the radiator 12 and stored in the reservoir tank 16 is supplied to the electrical component 15.

In the battery cooling apparatus 20, the second water pump 22 is operated to cool the battery module 24.

Accordingly, the coolant stored in the reservoir tank 16 is supplied to the battery module 24, while circulating through the battery coolant line 21 connected to the reservoir tank 16 by the operation of the second valve V2.

That is, the coolant cooled in the radiator 12 and stored in the reservoir tank 16 circulates through the coolant line 11 and the battery coolant line 21 by the operations of the first and second water pumps 14 and 22, respectively, to efficiently cool the electrical component 15 and the battery module 24.

The air conditioner 50 and the gas injection unit 70 are not operated because the cooling mode of the vehicle is not activated.

On the other hand, although it has been described in the exemplary embodiment of the present invention that both of the electrical component 15 and the battery module 24 are cooled, the present invention is not limited thereto, and when one of the electrical component 15 and the battery module 24 is separately cooled, the first and second water pumps 14 and 22 may be selectively operated.

An operation of the case of cooling the battery module 24 in the cooling mode of the vehicle will be described with respect to FIG. 43.

Figure 4:
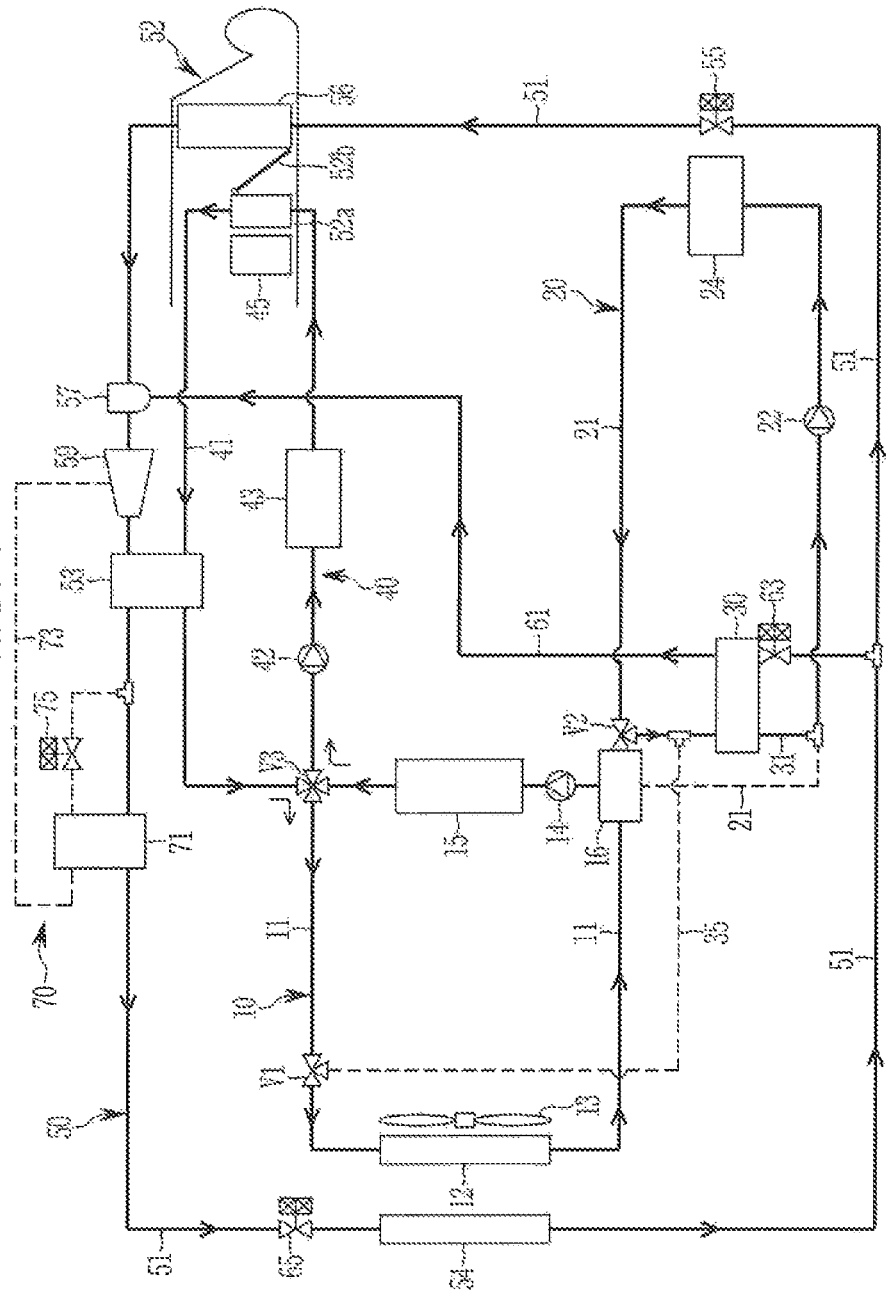
FIG. 4 illustrates an operational state diagram for cooling a battery module by use of a refrigerant in a cooling mode of a vehicle in the heat pump system for a vehicle according to an exemplary embodiment of the present invention.

FIG. 4 illustrates an operational state diagram for cooling a battery module by use of a refrigerant in a cooling mode of a vehicle in the heat pump system for a vehicle according to an exemplary embodiment of the present invention.

Referring to FIG. 4, in the cooling apparatus 10, the coolant is circulated in the coolant line 11 through operation of the first water pump 14. Accordingly, the coolant cooled by the radiator 12 is circulated to the electrical component 15.

Herein, the connection line 35 is closed through operation of the first valve V1.

In the heating apparatus 40, the coolant line 11 and the heating line 41 are connected through operation of the third valve V3 such that the coolant supplied from the cooling apparatus 11 is circulated.

Thus, the coolant cooled by the radiator 12 may be supplied to the condenser 53 through operation of the first and third water pumps 14 and 42.

In the battery cooling apparatus 20, the branch line 31 is opened through operation of the second valve V2. A portion of the battery coolant line 21 connected to the reservoir tank 16 is closed on the basis of the branch line 31.

In the present state, the coolant having passed through the chiller 30 may be supplied to the battery module 24 while it circulates along the branch line 31 and the battery coolant line 21 connected to the branch line 31 without passing through the reservoir tank 16 through operation of the second water pump 22.

That is, in the battery cooling apparatus 20, a closed circuit through which the coolant independently circulates may be formed by connecting the opened branch line 31 with the battery coolant line 21 in a state where the connection with the connection of the reservoir tank 16 is closed through operation of the second valve V2.

In the air conditioner 50, each constituent element operates to cool the interior of the vehicle. Accordingly, the refrigerant is circulated along the refrigerant line 51.

Herein, the refrigerant line 51 connecting the heat exchanger 54 and the evaporator 56 is opened through operation of the first expansion valve 55. The refrigerant connection line 61 is opened through operation of the second expansion valve 63.

Accordingly, the refrigerant having passed through the heat exchanger 54 may be circulated along the refrigerant line 51 and the refrigerant connection line 61.

Herein, the first and second expansion valves 55 and 63 may expand the refrigerant such that the expanded refrigerant is supplied to the evaporator 56 and the chiller 40, respectively. The third expansion valve 65 may inflow the refrigerant supplied from the condenser 53 to the heat exchanger 54 without expanding.

Meanwhile, the heating apparatus 40 supplies the coolant supplied from the cooling apparatus 10 to the condenser 53 through operation of the third water pump 42.

Accordingly, the condenser 53 condenses the coolant using the coolant flowing along the heating line 41. Also, the heat exchanger 54 may additionally condense the refrigerant inflowed from the condenser 53 through operation of the third expansion valve 65 through heat exchange with the outside air.

The coolant passing through the chiller 30 is circulated in the battery coolant line 21 and the branch line 31 without passing through the reservoir tank 16 to cool the battery module through operation of the second water pump 22.

The coolant passing through the chiller 30 is cooled through heat exchange with the expanded refrigerant which is supplied to the chiller 30. The coolant cooled in the chiller 30 is supplied to the battery module 24. Accordingly, the battery module 24 is cooled by the cooled coolant.

That is, the second expansion valve 63 expands some of the coolant through the sub-condenser 54 to supply the expanded refrigerant to the chiller 30, and opens the refrigerant connection line 61.

Accordingly, the refrigerant discharged from the heat exchanger 54 is expanded to enter a low-temperature and low-pressure state through operation of the second expansion valve 63, and flows into the chiller 30 connected to the refrigerant connection line 61.

Then the refrigerant inflowed to the chiller 30 undergoes heat transfer with the coolant and then inflows to the compressor 59 after passing through the accumulator 57 through the refrigerant connection line 61.

In other words, the coolant with the increased temperature from cooling the battery module 24 is cooled through heat exchange inside the chiller 30 with the low temperature low pressure refrigerant. The cooled coolant is again supplied to the battery module 24 through the battery coolant line 21 and the branch line 31.

That is, the coolant may efficiently cool the battery module 24 while repeating the above-described operation.

Meanwhile, the remaining coolant exhausted from the heat exchanger 54 flows through the refrigerant line 51 to cool the interior of the vehicle, and sequentially passes through the first expansion valve 55, the evaporator 56, the compressor 59, and the condenser 53.

Here, the outside air which is inflowed to the HVAC module 52 is cooled by the low temperature refrigerant inflowed to the evaporator 56 while passing through the evaporator 56.

At the present time, the door 52b reduces a portion of the cooled outside air passing through the evaporator 56 to not pass through the heater 52a. Thus, the cooled outside air may be directly directed into the interior of the vehicle, cooling the interior of the vehicle.

On the other hand, in the evaporator 56, the refrigerant of which the condensed amount is increased while sequentially passing through the condenser 53 and the heat exchanger 54 is expanded and supplied, evaporating the refrigerant with the further lower temperature.

That is, in the exemplary embodiment of the present invention, the condenser 53 condenses the refrigerant, and the heat exchanger 54 further condenses the refrigerant, favoring the subcooling formation of the refrigerant.

As the subcooled refrigerant evaporates with the lower temperature in the evaporator 56, the temperature of the air which is heat exchanged at the evaporator 56 may be further reduced, improving cooling performance and efficiency.

On the other hand, the gas injection unit 70 is deactivated.

While repeating the above-described process, the refrigerant may cool the interior of the vehicle in the cooling mode and simultaneously cool the coolant through the heat exchange while passing through the chiller 30.

The coolant of a low temperature cooled by the chiller 30 inflows to the battery module 24. Accordingly, the battery module 24 may be efficiently cooled by the supplied low temperature coolant.

In the exemplary embodiment of the present invention, the operation for the case of recovering the waste heat of the external heat source, the electrical component 15, and the battery module 24 in the heating mode of the vehicle is described with reference to FIG. 5.

Figure 5:
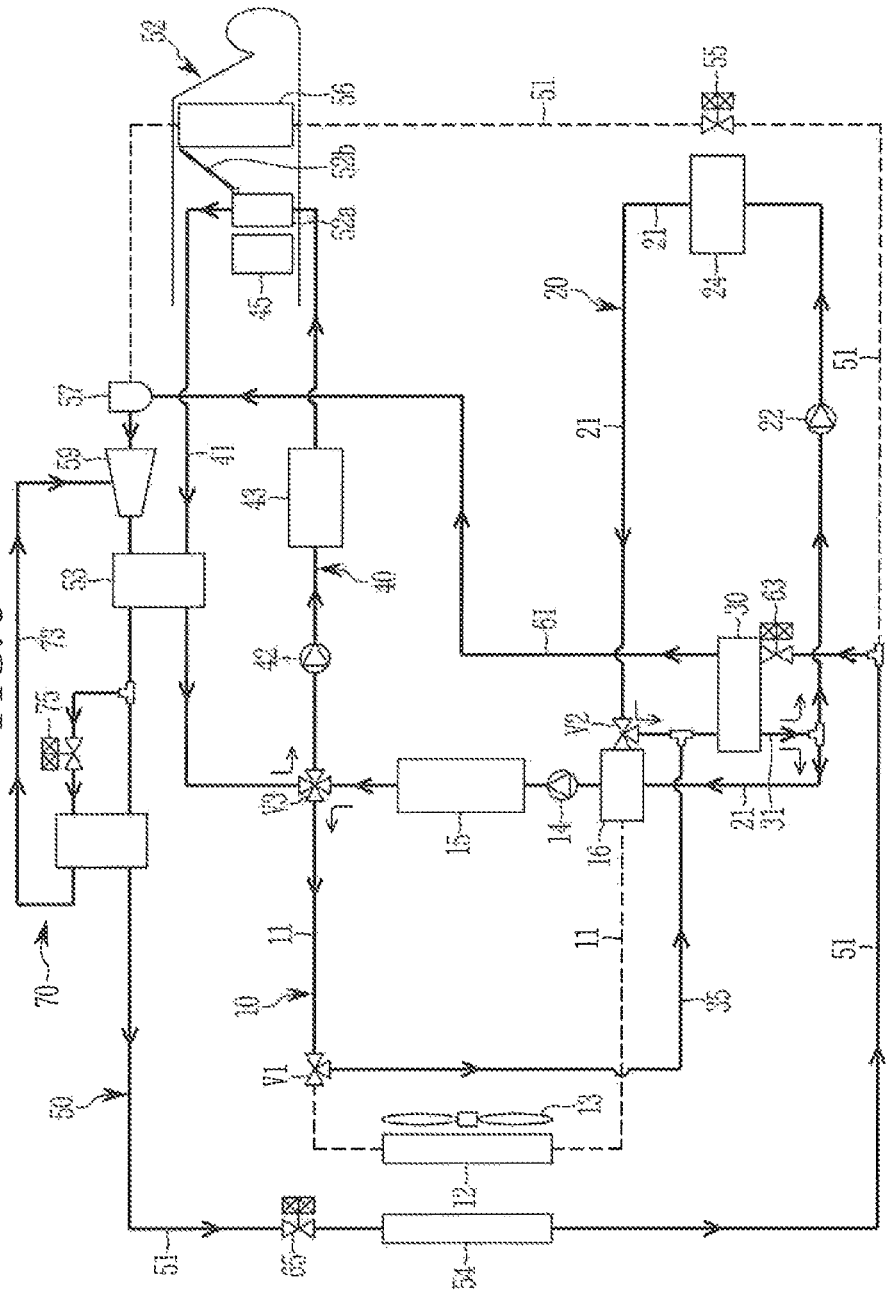
FIG. 5 illustrates an operational state diagram for waste heat recovery of external heat, an electrical component, and a battery module depending on a heating mode in a heat pump system for a vehicle according to an exemplary embodiment of the present invention.

FIG. 5 illustrates an operational state diagram for waste heat recovery of external heat, an electrical component, and a battery module depending on a heating mode in a heat pump system for a vehicle according to an exemplary embodiment of the present invention.

Referring to FIG. 5, the heat pump system may absorb the external heat air along with the waste heat of the electrical component 15 and the battery module 24 in an initial starting idle state IDLE of the vehicle or in a during initial driving state where the waste heat of the electrical component 15 is insufficient.

First, in the cooling apparatus 10, the first water pump 14 is operated for circulation of the coolant.

Herein, the connection line 35 is opened through operation of the first valve V1. At the same time, on the basis of the connection line 35, a portion of the coolant line 11 connected to the radiator 12 and a portion of the coolant line 11 connecting the radiator 12 and the reservoir tank 16 are closed through operation of the first valve V1.

In the present state, the coolant passing through the electrical component 15 may be supplied to the chiller 30 along the opened connection line 35 without passage through the radiator 12 through operation of the first water pump 14.

Meanwhile, in the battery cooling apparatus 20, the branch line 31 and the battery coolant line 21 are opened through operation of the second valve V2, respectively. The coolant passing through the battery module 24 may be supplied to the chiller 30 along the branch line 31 through operation of the second water pump 22.

That is, in the cooling apparatus 10, the coolant line 11 is connected to the branch line 31 through the opened connection line 35. In the battery cooling apparatus 20, on the basis of the branch line 31, a portion of the battery coolant line 21 connected to the battery module 24 and a portion of the battery coolant line 21 connected to the reservoir tank 16 are connected to the branch line 31, respectively.

Thus, the coolant passing through the electrical component 15 continuously circulates along the coolant line 11, the connection lines 35, and the branch line 31 without passing through the radiator 12, and absorbs the waste heat from the electrical component 15 such that the temperature is increased.

Furthermore, the coolant passing through the battery module 24 continuously circulates along the battery coolant line 21 and the branch line 31, and absorbs the waste heat from the battery module 24 such that the temperature is increased.

The coolant with the increased temperature may be supplied to the chiller 30 provided at the branch line 31. That is, the waste heat generated by the electrical component 15 and the battery module 24 raises the temperature of the coolant circulating through the coolant line 11 and the battery coolant line 21, respectively.

In the heating apparatus 40, the coolant circulates along the heating line 41 through operation of the third water pump 42.

The coolant line 11 and the heating line 41 may form the independent closed circuit through operation of the third valve V3.

Thus, the coolant circulating through the heating line 41 may be supplied to the condenser 53 after passing through the heater 52a through operation of the third water pump 42.

Here, the coolant heater 43 is operated when the temperature of the coolant circulating along the heating line 41 is lower than the target temperature, so that the coolant circulating in the heating line 41 may be heated.

On the other hand, when the air heater 45 is applied instead of the coolant heater 43, the air heater 45 operates when the temperature of the outside air passing through the heater 52a is lower than the target temperature, and the outside air inflowed to the interior of the vehicle may be heated.

In the air conditioner 50, each constituent element operates to heat the vehicle interior. Thus, the refrigerant circulates along the refrigerant line 51. Furthermore, the gas injection unit 70 is operated.

Here, the refrigerant line 51 connecting the condenser 53 and the evaporator 56 is closed through operation of the first expansion valve 55.

The refrigerant connection line 61 is opened through operation of the second expansion valve 63.

Here, the second expansion valve 63 may supply the refrigerant to the chiller 30 by expanding the refrigerant supplied from the heat exchanger 54 to the refrigerant connection line 61.

The third expansion valve 65 may also supply the refrigerant to the heat exchanger 54 by expanding the refrigerant supplied from the condenser 53.

Thus, the heat exchanger 54 recovers the external heat while evaporating the expanded refrigerant through heat exchange with the outside air.

The coolant, which absorbs the waste heat of the electrical component 15 and the battery module 24 and is increased in temperature, is recovered by increasing the temperature of the refrigerant supplied to the chiller 30 while passing through the chiller 30 through operation of the first and second water pumps 14 and 22.

That is, the chiller 30 receives the refrigerant supplied from the heat exchanger 54 and expanded through operation of the second expansion valve 63 through the refrigerant connection line 61, and evaporates the supplied refrigerant through heat exchange with the coolant of which the temperature is increased while passing through the electrical component 15 and the battery module 24, respectively, recovering the waste heat of the electrical component 15 and the battery module 24.

Next, the refrigerant passing through the chiller 30 is supplied to the accumulator 57 along the refrigerant connection line 61.

The refrigerant supplied to the accumulator 57 is separated into gas and liquid. Of the refrigerant separated by gas and liquid, the gaseous refrigerant is supplied to the compressor 59.

The refrigerant compressed with the high temperature high pressure from the compressor 59 inflows to the condenser 53.

Here, the refrigerant supplied to the condenser 53 may increase the temperature of the coolant by exchanging heat with the coolant circulating through the heating line 41. The coolant with raised temperature is supplied to the heater 52a.

Meanwhile, the door 52b is opened so that the outside air inflowed to the HVAC module 52 and passing through the evaporator 56 passes through the heater 52a.

As a result, the outside air inflow from the outside flows into the interior in an uncooled temperature state when passing through the evaporator 56, which is not supplied with the refrigerant. The inflowed outside air is converted to a high temperature state while passing through the heater 52a to be inflowed into the interior of the vehicle, realizing the heating of the interior of the vehicle.

On the other hand, when the gas injection unit 70 is operated, some of the refrigerant passing through the condenser 53 is flowed into the bypass line 73.

The refrigerant inflowed to the bypass line 73 is flowed into the plate-type heat exchanger 71 in the expanded state through operation of the fourth expansion valve 75.

The expanded refrigerant inflowed through the bypass line 73 enters the gaseous state in the plate-type heat exchanger 71 by heat-exchanging with the remaining refrigerant inflowed through the refrigerant line 51 from the condenser 53.

The refrigerant of the gaseous state is supplied to the compressor 59 through the opened bypass line 73.

That is, the gas injection unit 70 again inflows the refrigerant of the gas state, which undergoes heat transfer while passing through the plate-type heat exchanger 71 to the compressor 59 through the bypass line 73, increasing the flow rate of the refrigerant circulating through the refrigerant line 51.

Also, the refrigerant discharged through the refrigerant line 51 from the plate-type heat exchanger 71 is flowed into the heat exchanger 54 along the refrigerant line 51 which is open through operation of the third expansion valve 65.

That is, in the gas injection unit 70, the plate-type heat exchanger 71 may mutually heat-exchange the refrigerant inflowed through the bypass line 73 and the refrigerant inflowed through the refrigerant line 51. And the plate-type heat exchanger 71 bypass the refrigerant of the gaseous state to the compressor 59 through the bypass line 73.

The refrigerant may then be further condensed through heat exchange with the outside air in the heat exchanger 54, increasing the condensation amount of the first refrigerant.

The refrigerant with the increased condensation amount may smoothly recover the waste heat from the coolant of which the temperature is increased while passing through the electrical component 15 and the battery module 24 in the chiller 30, improving the heating performance and the efficiency.

That is, the heat pump system according to the exemplary embodiment of the present invention absorbs the external heat from the heat exchanger 54 when the heating is required in the initial starting idle state (IDLE) of the vehicle or the during initial driving state and is used to increase the temperature of the refrigerant by use of the waste heat of the electrical component 15 and the battery module 24, reducing the power consumption of the compressor 59 and improving the heating efficiency.

Furthermore, the present invention may improve heating efficiency and performance while minimizing the use amount of separate electric heater.

Furthermore, the gas injection unit 70 increases the flow rate of the refrigerant, maximizing heating performance.

Meanwhile, in the exemplary embodiment of the present invention, the waste heat of the electrical component 15 and the battery module 24 are recovered together as an exemplary embodiment of the present invention, but the exemplary embodiment is not limited thereto, and the waste heat of the battery module 24 may be selectively recovered.

That is, when the waste heat of the battery module 24 is not recovered, in the battery cooling apparatus 20, a remaining of the battery coolant line 21 is closed except for a portion of the battery coolant line 21 connected to the reservoir tank 16 based on the branch line 31, and the operation of the second water pump 22 may be stopped.

In the exemplary embodiment of the present invention, the operation for the case of recovering the waste heat of the electrical component 15 depending on the heating/dehumidification mode of the vehicle is described with reference to FIG. 6.

Figure 6:
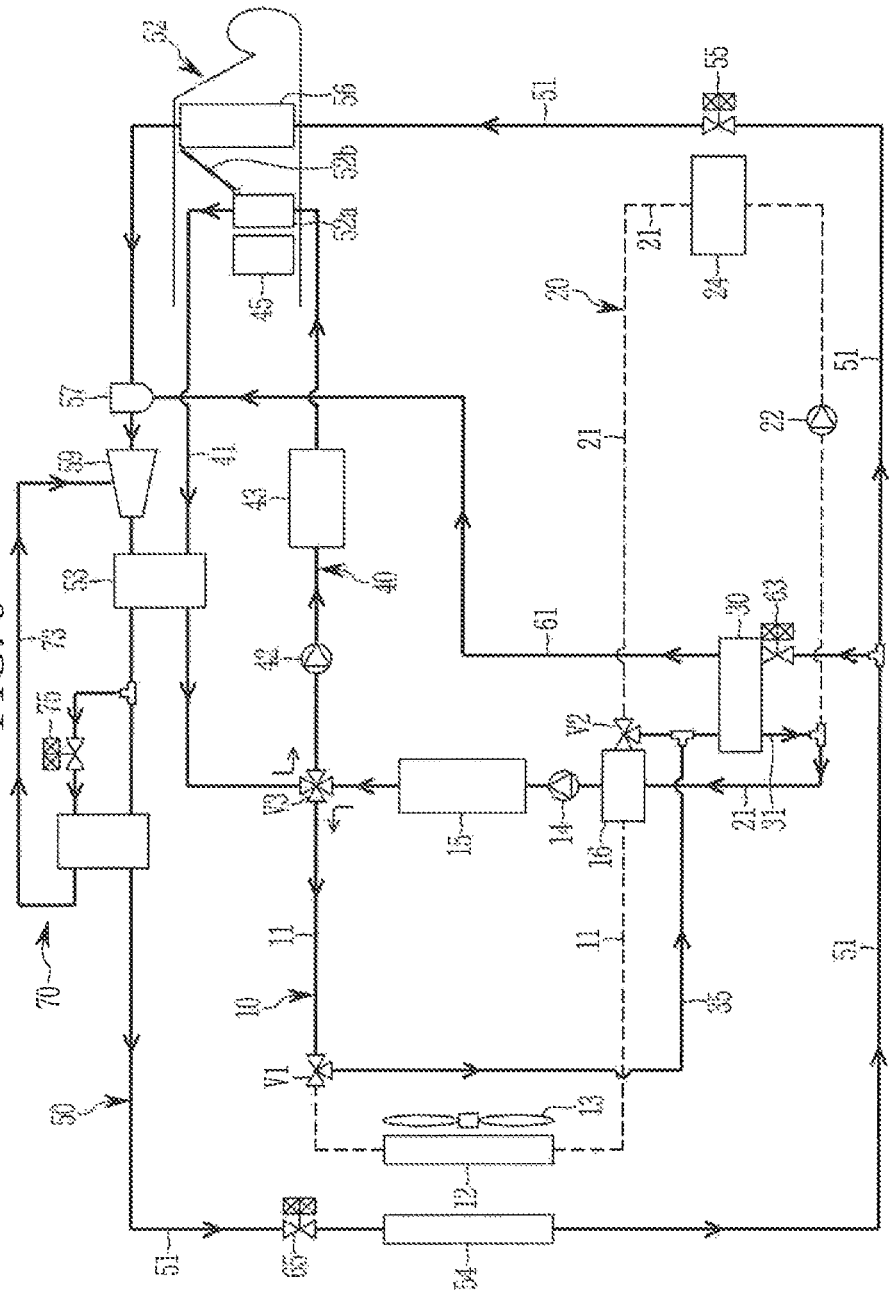
FIG. 6 illustrates an operational state diagram for a heating/dehumidification mode in a heat pump system for a vehicle according to an exemplary embodiment of the present invention.

FIG. 6 illustrates an operational state diagram for a heating/dehumidification mode in a heat pump system for a vehicle according to an exemplary embodiment of the present invention.

Referring to FIG. 6, the heat pump system may recover the waste heat of the electrical component 15 in the heating/dehumidification mode of the vehicle to use the internal heating.

Here, when the temperature of the vehicle interior is a low temperature, the heat pump system may recover the external heat along with the waste heat of the electrical component 15. Whereas, when the temperature of the vehicle interior is a high temperature, it may only recover the waste heat of the electrical component 15 to use in the internal heating of the vehicle.

First, in the cooling apparatus 10, the first water pump 14 is operated for circulation of the coolant.

Herein, the connection line 35 is opened through operation of the first valve V1. At the same time, on the basis of the connection line 35, a portion of the coolant line 11 connected to the radiator 12 and a portion of the coolant line 11 connecting the radiator 12 and the reservoir tank 16 are closed through operation of the first valve V1.

In the present state, the coolant passing through the electrical component 15 may be supplied to the chiller 30 along the opened connection line 35 without passage through the radiator 12 through operation of the first water pump 14.

Meanwhile, in the battery cooling apparatus 20, the branch line 31 is opened through operation of the second valve V2, and a remaining of the battery coolant line 21 is closed except for a portion of the battery coolant line 21 connected to the reservoir tank 16 based on the branch line 31.

That is, the battery coolant line 21 connecting the second water pump 22 and the battery module 24 is closed, and the operation of the second water pump 22 is stopped.

In the present state, the coolant passing through the electrical component 15 is continuously circulated along the coolant line 11, the connection line 35, and the branch line 31 without the passage through the radiator 12, and absorbs the waste heat from the electrical component 15 such that the temperature is increased.

The coolant with the increased temperature may be supplied to the chiller 30 provided at the branch line 31.

The coolant discharged from the chiller 30 is introduced into the reservoir tank 16 through the branch line 31 and the opened battery coolant line 21. Accordingly, the coolant passes through the electrical appliance 15 along the coolant line 11 from the reservoir tank 16 through operation of the first water pump 14, may flow into the connection line 35.

That is, the waste heat generated by the electrical component 15 raises the temperature of the coolant circulating through the coolant line 11, the connection line 35, the branch line 31, and the opened battery coolant line 21.

In the heating apparatus 40, the coolant circulates along the heating line 41 through operation of the third water pump 42.

The coolant line 11 and the heating line 41 may form the independent closed circuit through operation of the third valve V3.

Thus, the coolant circulating through the heating line 41 may be supplied to the condenser 53 after passing through the heater 52a through operation of the third water pump 42.

Here, the coolant heater 43 is operated when the temperature of the coolant circulating along the heating line 41 is lower than the target temperature, so that the coolant circulating in the heating line 41 may be heated.

On the other hand, when the air heater 45 is applied instead of the coolant heater 43, the air heater 45 operates when the temperature of the outside air passing through the heater 52a is lower than the target temperature, and the outside air inflowed to the interior of the vehicle may be heated.

In the air conditioner 50, each constituent element operates to heat the vehicle interior. Thus, the refrigerant circulates along the refrigerant line 51. Furthermore, the gas injection unit 70 is operated.

Here, the refrigerant line 51 connecting the condenser 53 and the evaporator 56 is opened through operation of the first expansion valve 55.

The refrigerant connection line 61 is opened through operation of the second expansion valve 63.

Here, the first and second expansion valves 55 and 63 may expand the refrigerant supplied to the refrigerant connection line 61 and the refrigerant line 51 from the heat exchanger 54 so that the expanded refrigerant is supplied to the evaporator 56 and the chiller 30.

Furthermore, when the temperature of the vehicle interior is low, the third expansion valve 65 may expand the refrigerant supplied from the condenser 53 to be inflowed to the heat exchanger 54.

Accordingly, the heat exchanger 54 recovers the external heat while evaporating the expanded refrigerant through the heat exchange with the outside air.

Conversely, the third expansion valve 65 may inflow the refrigerant supplied from the condenser 53 to the heat exchanger 54 without expanding when the temperature of the vehicle interior is high.

Accordingly, the heat exchanger 54 may condense the refrigerant through heat exchange with the outside air.

Also, the coolant of which the temperature is increased by absorbing the waste heat of the electrical component 15 is recovered while increasing the temperature of the refrigerant supplied to the chiller 30 while passing through the chiller 30 through operation of the first water pump 14.

That is, the chiller 30 receives the refrigerant supplied from the heat exchanger 54 and expanded through operation of the second expansion valve 63 through the refrigerant connection line 61, and evaporates the supplied refrigerant through heat exchange with the coolant of which the temperature is increased while passing through the electrical component 15, recovering the waste heat of the electrical component 15.

Next, the refrigerant passing through the chiller 30 is supplied to the accumulator 57 along the refrigerant connection line 61.

The refrigerant supplied to the accumulator 57 is separated into gas and liquid. Of the refrigerant separated by gas and liquid, the gaseous refrigerant is supplied to the compressor 59.

The refrigerant compressed from the compressor 59 with the high temperature high pressure inflows to the condenser 53.

Here, the refrigerant supplied to the condenser 53 may increase the temperature of the coolant by exchanging heat with the coolant circulating through the heating line 41. The coolant with raised temperature is supplied to the heater 52a.

On the other hand, the expanded refrigerant supplied to the evaporator 56 though the operation of the first expansion valve 55 exchanges heat with the outside air passing through the evaporator 56, and is then supplied to the compressor 59 through the accumulator 57 along the refrigerant line 51.

That is, the refrigerant passing through the evaporator 56 may be supplied to the compressor 59 along with the refrigerant inflowed to the accumulator 57 through the refrigerant connection line 61.

The refrigerant compressed by the compressor 59 with high temperature and high pressure is then inflowed to the condenser 53.

Here, the door 52b is opened so that the outside air inflowed to the HVAC module 52 and passing through the evaporator 56 passes through the heater 52a.

That is, the outside air inflowed to the HVAC module 52 is dehumidified while passing through the evaporator 56 by the refrigerant of the low temperature state inflowed to the evaporator 56. Next, the outside air is converted into a high temperature state while passing through the heater 52a and inflowing to the vehicle interior, heating and dehumidifying the interior of the vehicle.

On the other hand, when the gas injection unit 70 is operated, some of the refrigerant passing through the condenser 53 is flowed into the bypass line 73.

The refrigerant inflowed to the bypass line 73 is flowed into the plate-type heat exchanger 71 in the expanded state through operation of the fourth expansion valve 75.

The expanded refrigerant inflowed through the bypass line 73 enters the gaseous state in the plate-type heat exchanger 71 by heat-exchanging with the remaining refrigerant inflowed through the refrigerant line 51 from the condenser 53.

The refrigerant of the gaseous state is supplied to the compressor 59 through the opened bypass line 73.

That is, the gas injection unit 70 again inflows the refrigerant of the gas state, which undergoes heat transfer while passing through the plate-type heat exchanger 71 to the compressor 59 through the bypass line 73, increasing the flow rate of the refrigerant circulating through the refrigerant line 51.

Also, the refrigerant discharged through the refrigerant line 51 from the plate-type heat exchanger 71 is flowed into the heat exchanger 54 along the refrigerant line 51 which is opened through operation of the third expansion valve 65.

That is, in the gas injection unit 70, the plate-type heat exchanger 71 may mutually heat-exchange the refrigerant inflowed through the bypass line 73 and the refrigerant inflowed through the refrigerant line 51. And the plate-type heat exchanger 71 bypass the refrigerant of the gaseous state to the compressor 59 through the bypass line 73.

The refrigerant may then be further condensed through heat exchange with the outside air in the heat exchanger 54, increasing the condensation amount of the first refrigerant.

The refrigerant with the increased condensation amount may smoothly recover the waste heat from the coolant of which the temperature is increased while passing through the electrical component 15 and the battery module 24 in the chiller 30, improving the heating performance and the efficiency.

That is, the heat pump system according to the exemplary embodiment of the present invention selectively absorbs the external heat depending on the internal temperature of the vehicle along with the waste heat generated from the electrical component 15 in the heating/dehumidification mode of the vehicle by being used to increase the temperature of the refrigerant, reducing the power consumption of the compressor 59 and improving the heating efficiency.

Furthermore, the gas injection unit 70 increases the flow rate of the refrigerant, maximizing heating performance.

In the exemplary embodiment of the present invention, the operation for the case of using the waste heat of the electrical equipment 15 in the heating mode of the vehicle without the operation of the air conditioner 50 is described with reference to FIG. 7.

Figure 7:
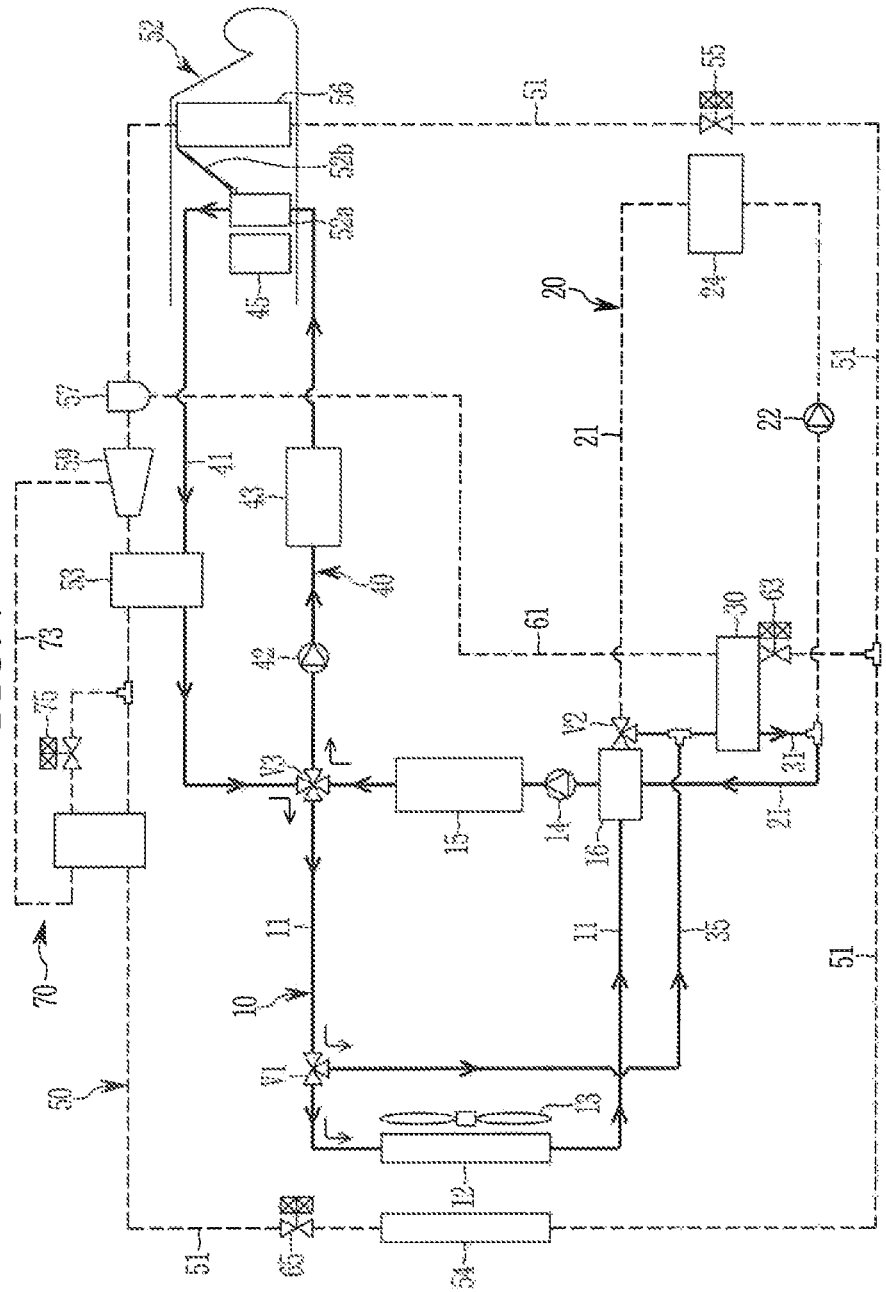
FIG. 7 illustrates an operational state diagram for recovering and cooling waste heat of an electrical component in a heating mode of a vehicle in a heat pump system for a vehicle according to an exemplary embodiment of the present invention.

FIG. 7 illustrates an operational state diagram for recovering and cooling waste heat of an electrical component in a heating mode of a vehicle in a heat pump system for a vehicle according to an exemplary embodiment of the present invention.

Referring to FIG. 7, the heat management system may recover the waste heat of the electric component 15 and use it for heating the interior of the vehicle.

First, in the cooling apparatus 10, the first water pump 14 is operated for circulation of the coolant. In the instant case, the air conditioner 50 and the gas injection unit 70 are deactivated.

Herein, the connection line 35 is opened through operation of the first valve V.

Accordingly, in the cooling apparatus 10, on the basis of the connection line 35, a portion of the coolant line 11 connected to the radiator 12 and a portion of the coolant line 11 connecting the radiator 12 and the reservoir tank 16 are closed through operation of the first valve V1.

The branch line 31 is opened through operation of the second valve V1 to close the battery coolant line 21 other than a portion of the battery cooling water line 21 connected to the reservoir tank 16 with respect to the branch line 31.

That is, the battery coolant line 21 connecting the second water pump 22 and the battery module 24 is closed, and the operation of the second water pump 22 is stopped.

In the present state, the coolant whose the temperature is increased while passing through the electrical component 15 by the operation of the first water pump 14 is supplied to the heater 52a along the heating line 41 connected through the third valve V3 without passing through the radiator 12.

Here, the coolant introduced into the heating line 41 passes through the heater 52a by the operation of the third water pump 42. At the instant time, the coolant heater 43 is operated when the temperature of the coolant circulating along the heating line 41 is lower than the target temperature, so that the coolant circulating in the heating line 41 may be heated.

On the other hand, when the air heater 45 is applied instead of the coolant heater 43, the air heater 45 may be selectively operated depending on the temperature of the outside air passing through the heater 52a.

The air heater 45 may be operated when the temperature of the outside air passing through the heater 52a is lower than a target temperature, heating the outside air flowing into the interior of the vehicle.

The air heater 45 is operated when the temperature of the outside air that has completed heat exchange with the high-temperature coolant while passing through the heater 52a is lower than a predetermined temperature or a target heating temperature.

As a result, when the air heater 45 is operated, the outside air may be heated while passing through the air heater 45, to be introduced into the vehicle interior in a state where the temperature is raised.

In the exemplary embodiment of the present invention, the coolant discharged from the heater 52a is introduced into the coolant line 11 via the heating line 41 and the third valve V3, and then is supplied into the chiller 30 along the connection line 35 and the branch line 31.

Here, since the coolant supplied to the chiller 30 does not flow into the chiller 30, the coolant 30 may pass through the chiller 30 without heat exchange with the refrigerant.

The coolant discharged from the chiller 30 passes through the branch line 31 and the opened battery coolant line 21 sequentially, and introduces into the reservoir tank 16 again.

That is, the coolant that has passed through the electrical component 15 continues to circulate along the coolant line 11, the heating line 41, the connection line 35, the branch line 31, and a portion of the battery coolant line 21 without passing through the radiator 12, and absorbs the waste heat from the electric component 15, such that the temperature thereof increases.

The coolant having the temperature that has been raised is introduced into the heating line 41 connected to the coolant line 11 through operation of the third valve V3. Accordingly, the high-temperature coolant introduced into the heating line 41 is supplied to the heater 52a.

Herein, the opening and closing door 52b is opened such that the outside air flowing into the HVAC module 52 passes through the heater 52a.

Accordingly, the outside air introduced from the outside flows in a room temperature state in which it is not cooled when passing through the evaporator 56 to which no refrigerant is supplied. The introduced outside air may be converted into a high temperature state while passing through the heater 52a, and flows into the vehicle, heating the interior of the vehicle.

In other words, according to an exemplary embodiment of the present invention, it is possible to recover the waste heat generated in the electrical component 15 while repeating the above-described process, and use the waste heat for internal heating, reducing power consumption and improving overall heating efficiency.

On the other hand, in a process of heating the interior of the vehicle by recovering the waste heat of the electrical component 15 using the coolant, when the electrical component 15 is overheated, a portion of the coolant line 11 connected to the radiator 12, and a portion of the coolant line 11 connecting the radiator 12 and the reservoir tank 16 are open through operation of the first valve V1.

Accordingly, the remaining coolant, which is not supplied to the heater 52a, is cooled through the radiator 12.

The coolant that has been completely cooled may recover waste heat while passing through the electrical component 15, and at the same time, may efficiently cool the electrical component 15, together with the coolant introduced into the reservoir tank 16 through the connection line 35, the branch line 31, and a portion of the battery coolant line 21.

When the electrical component 15 is overheated, the first valve V1 may open the coolant line 11 connected to the radiator 12 to allow some of the coolant passing through the electrical component 15 to flow into the connection line 35 and the remaining coolant to flow into the radiator 12.

As a result, some coolant cooled in the radiator 12 may be supplied to the electrical component 15, preventing the electrical component 15 from overheating.

Therefore, according to an exemplary embodiment of the present invention, it is possible to recover the waste heat generated in the electrical component 15, and use the waste heat for internal heating, reducing power consumption and improving overall heating efficiency.

At the same time, according to an exemplary embodiment of the present invention, some coolant may be introduced into the radiator 12 through operation control of the first valve V1 configured for distributing the flow, to be cooled, and then be supplied to the electrical component 15, efficiently cooling the electrical component 15 and ensuring the cooling performance of the electrical component 15.

An operation of the case of heating the battery module 26 will be described with respect to FIG. 8.

Figure 8:
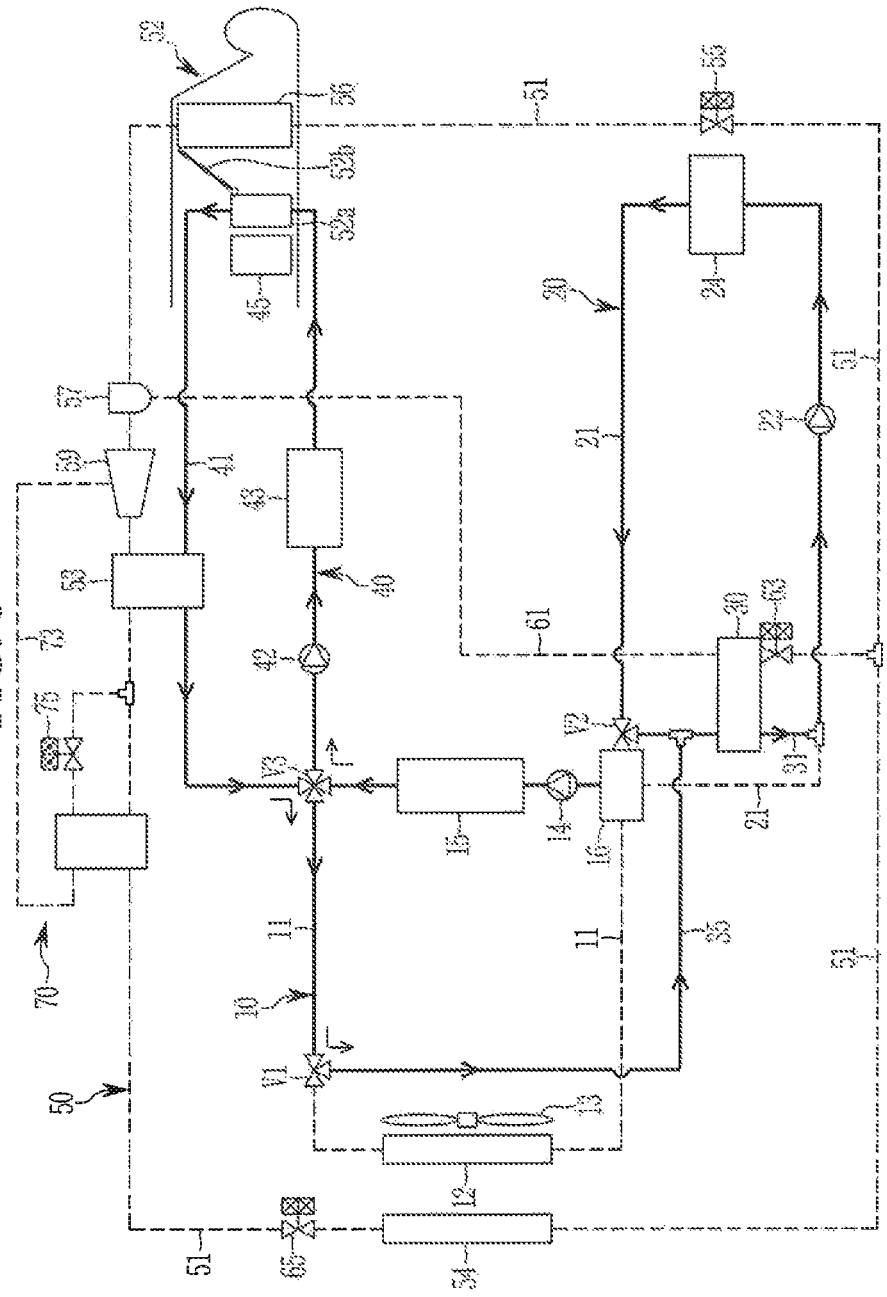
FIG. 8 illustrates an operational state diagram for heating of a battery module in a heat pump system for a vehicle according to an exemplary embodiment of the present invention.

FIG. 8 illustrates an operational state diagram for heating of a battery module in a heat pump system for a vehicle according to an exemplary embodiment of the present invention.

Referring to FIG. 8, the heat pump system may heat the battery module 26 by recovering the waste heat of the electrical component 15.

First, the connection line 35 is opened in the cooling device 10 in a state in which the coolant line 11 connected to the radiator 12 is closed through operation of the first valve V1. In the instant case, the air conditioner 50 and the gas injection unit 70 are deactivated.

The branch line 31 is opened through operation of the second valve V2. Accordingly, a remaining of the battery coolant line 21 is opened except for a portion of the battery coolant line 21 connected to the reservoir tank 16 based on the branch line 31.

As a result, the battery coolant line 21 connected to the reservoir tank 16 is closed, and the remaining battery coolant line 21 connected to the battery module 24 may be opened.

That is, the battery coolant line 21 connecting the second water pump 22 and the battery module 24 in the battery cooling apparatus 20 is open to be connected to the branch line 31.

Accordingly, in the battery cooling apparatus 20, the coolant is circulated along the opened battery coolant line 21 and the branch line 31 through operation of the second water pump 22.

Some of the coolant passing through the battery module 24 may be introduced into the reservoir tank 16 connected through the second valve V2, and the remaining coolant may flow into the branch line 31.

Meanwhile, in the heating apparatus 40, the coolant line 11 and the heating line 41 are connected through operation of the third valve V3.

In the present state, the coolant whose the temperature is increased while passing through the electrical component 15 by the operation of the first water pump 14 is flowed to the heating line 41 connected through the third valve V3 without passing through the radiator 12.

That is, the coolant with the increased temperature by the waste heat of the electrical component 15 in the cooling apparatus 11 may circulate through the heating line 41 through operation of the third water pump V3.

Herein, the coolant heater 43 is operated to heat the coolant when the temperature of the coolant circulating along the heating line 41 is lower than the target temperature. Accordingly, the coolant circulating in the heating line 41 rises in temperature as it passes through the coolant heater 43.

Accordingly, the coolant having an increased temperature while passing through the coolant heater 43, is flowed into the coolant line 11 from the heating line 41 through the third valve V3. Accordingly, the high-temperature coolant is introduced into the branch line 31 from the coolant line 11 through the connection line 31.

The high-temperature coolant introduced into the branch line 31 may be supplied to the battery module 24 connected through the battery coolant line 21 and the branch line 31.

As a result, the high-temperature coolant may raise the temperature of the battery module 24.

As a result, according to an exemplary embodiment of the present invention, it is possible to rapidly increase the temperature of the battery module 24 while repeating the above-described process, efficiently managing the temperature of the battery module 24.

Thus, if the heat pump system for the vehicle according to an exemplary embodiment of the present invention as described above is applied, the temperature of the battery module 24 may be adjusted depending on the mode of the vehicle by use of one chiller 30 for performing heat exchange between the coolant and the refrigerant, and the interior of the vehicle may be heated by use of the coolant, simplifying the entire system.

According to an exemplary embodiment of the present invention, it is also possible to improve the heating efficiency by recovering waste heat from the electrical component 15 and using it for internal heating.

Furthermore, according to an exemplary embodiment of the present invention, it is possible to optimize the performance of the battery module 24 by efficiently controlling the temperature of the battery module 24, and increase an overall travel distance of the vehicle through efficient management of the battery module 24.

Furthermore, the present invention may use the coolant heater 43 applied to the heating apparatus 40 to heat the battery module 24 or to assist in an internal heating of the vehicle, reducing the cost and weight.

Furthermore, the present invention selectively utilizes the external heat and the waste heat of the electrical component 15 and the battery module 24 in the heating mode of the vehicle, improving the heating efficiency.

The present invention also improves the condensing or evaporation performance of the refrigerant by use of the condenser 53 and the heat exchanger 54, improving the cooling performance and reducing the power consumption of the compressor 59.

Furthermore, the present invention may maximize the heating performance by applying the gas injection unit 70 to increase the flow rate of the refrigerant in the heating mode, or heating/dehumidification mode.

Furthermore, the present invention may reduce production cost and weight and improve space utilization by simplifying the entire system.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A heat pump system for a vehicle, the system including:
    a cooling apparatus including a radiator, a first water pump, a first valve, and a reservoir tank wherein the radiator, the first water pump, the first valve, and the reservoir tank are connected through a coolant line, and configured to circulate a coolant in the coolant line to cool at least one electrical component mounted in the coolant line;
    a battery cooling apparatus including a battery coolant line connected to the reservoir tank through a second valve, and a second water pump and a battery module wherein the second water pump and the battery module are connected through the battery coolant line to circulate the coolant in the battery module;

a heating apparatus including a heating line connected to the coolant line through a third valve to heat a vehicle interior by use of the coolant and a third water pump mounted on the heating line, and a heater;
a chiller mounted in a branch line connected to the battery coolant line through the second valve, and connected to a refrigerant line of an air conditioner through a refrigerant connection line, to adjust a temperature of the coolant by performing heat exchange between the coolant selectively introduced into a connection line connecting the coolant line and the branch line through the first valve, and the branch line and a refrigerant selectively supplied from the air conditioner; and
a gas injection unit mounted in the air conditioner and bypassing a portion of the refrigerant passing through the condenser connected to the heating line, to the condenser, so as to increase a flow rate of the refrigerant circulating through the refrigerant line.

2. The heat pump system for the vehicle of claim 1,
wherein a first end portion of the connection line is connected to the coolant line through the first valve and a second end portion of the connection line is connected to the between the second valve and the chiller, and
wherein the heater is mounted inside a heating, ventilation, and air conditioning (HVAC) module included in the air conditioner.

3. The heat pump system for the vehicle of claim 2, wherein
when the battery module is heated,
the connection line is opened in a state in which the coolant line connected to the radiator is closed through operation of the first valve,
the branch line is opened through an operation of the second valve,
a portion of the battery coolant line connected to the reservoir tank is closed based on the branch line,
the coolant is configured to circulate along the battery coolant line and the branch line through operation of the second water pump,
in the heating apparatus, the coolant line and the heating line are connected through operation of the third valve,
in the cooling apparatus, the coolant with the temperature increased by waste heat of the at least one electrical component is configured to circulate through the heating line through operation of the third water pump, and
a heated coolant introduced from the heating line and the coolant line is configured to be flowed into the branch line from the coolant line through the connection line, and is configured to be supplied to the battery module connected through the battery coolant line and the branch line.

4. The heat pump system for the vehicle of claim 1, wherein the air conditioner includes:
a heating, ventilation, and air conditioning module including an evaporator connected to the refrigerant line and a door configured to control outside air passing through the evaporator to be selectively introduced into the heater depending on a cooling mode, a heating mode, and a heating/dehumidifying mode of the vehicle;
the condenser connected to the heating line to circulate the coolant in the heating line to perform heat exchange between the coolant and a refrigerant supplied through the refrigerant line;
a compressor connected between the evaporator and the condenser through the refrigerant line;
a first heat exchanger mounted on the refrigerant line between the condenser and the evaporator;
a first expansion valve mounted in the refrigerant line between the first heat exchanger and the evaporator;
a second expansion valve mounted in the refrigerant connection line;
an accumulator mounted in the refrigerant line between the evaporator and the compressor and connected to the refrigerant connection line; and
a third expansion valve mounted in the refrigerant line between the condenser and the heat exchanger.

5. The heat pump system for the vehicle of claim 4, wherein the first heat exchanger is configured to condense or evaporate the refrigerant condensed in the condenser through heat exchange with the outside air depending on a selective operation of the third expansion valve.

6. The heat pump system for the vehicle of claim 4, wherein the second expansion valve is configured to expand the refrigerant inflowed through the refrigerant connection line to flow to the chiller when cooling the battery module by the coolant heat-exchanged with the refrigerant.

7. The heat pump system for the vehicle of claim 4, wherein the third expansion valve is configured to selectively expand the refrigerant inflowed to the first heat exchanger in the heating mode and the heating/dehumidification mode of the vehicle.

8. The heat pump system for the vehicle of claim 4, wherein the gas injection unit includes:
a second heat exchanger mounted on the refrigerant line between the condenser and the heat exchanger;
a bypass line having a first end portion connected to the refrigerant line between the condenser and the second heat exchanger, and a second end portion connected to the compressor by passing through the second heat exchanger; and
a fourth expansion valve mounted on the bypass line at a front of the second heat exchanger.

9. The heat pump system for the vehicle of claim 8, wherein the fourth expansion valve is configured to expand the refrigerant inflowed to the bypass line through the condenser in the heating mode or the heating/dehumidification mode of the vehicle.

10. The heat pump system for the vehicle of claim 4, wherein the gas injection unit includes:
a flash tank mounted on the refrigerant line between the condenser and the first heat exchanger and dividing the refrigerant passing through the condenser into a gaseous refrigerant and a liquid refrigerant to be selectively exhausted;
a bypass line connecting the flash tank and the compressor, and selectively suppling the refrigerant of the gaseous state from the flash tank to the compressor;
a bypass valve mounted on the bypass line; and
a fourth expansion valve mounted on the refrigerant line between the condenser and the flash tank.

11. The heat pump system for the vehicle of claim 10, wherein the fourth expansion valve is configured to expand the refrigerant inflowed to the bypass line through the condenser in the heating mode or the heating/dehumidification mode of the vehicle.

12. The heat pump system for the vehicle of claim 4,
wherein the heating, ventilation, and air conditioning module further includes an air heater mounted at a side of the evaporator, with the heater interposed therebetween to selectively heat outside air passing through the heater, and wherein the air heater is configured to be operated to raise a temperature of the outside air passing through the heater when a temperature of the coolant supplied to the heater is lower than a target temperature for internal heating.

13. The heat pump system for the vehicle of claim 4, wherein
when the battery module is cooled in the cooling mode of the vehicle,
the coolant circulates through the coolant line by operation of the first water pump in the cooling apparatus;
the connection line is closed through an operation of the first valve;
in the battery cooling apparatus, the branch line is opened through an operation of the second valve, and the coolant passing through the chiller through operation of the second water pump is supplied to the battery module along the battery coolant line and the branch line in a state in which the battery coolant line connected to the reservoir tank based on the branch line is closed;
in the heating apparatus, the coolant line and the heating line are connected through operation of the third valve so that the coolant is supplied from the cooling apparatus;
in the air conditioner, in a state that the refrigerant connection line is opened through operation of the second expansion valve, the refrigerant circulates along the refrigerant line and the refrigerant connection line;
the first and second expansion valves expand the refrigerant so that the expanded refrigerant is respectively supplied to the evaporator and the chiller;
the third expansion valve inflows the refrigerant supplied from the condenser to the heat exchanger; and
the gas injection unit is deactivated.

14. The heat pump system for the vehicle of claim 13, wherein the heating apparatus is configured to supply the coolant supplied from the cooling apparatus through operation of the third water pump to the condenser, and wherein the condenser is configured to condense the refrigerant through heat exchange with the coolant, and the first heat exchanger is configured to additionally condense the refrigerant inflowed from the condenser through heat exchange with the outside air.

15. The heat pump system for the vehicle of claim 4, wherein
when recovering a waste heat of an external heat source, the at least one electrical component, and the battery module in the heating mode of the vehicle,
the connection line is opened through operation of the first valve;
in the cooling apparatus, on a basis of the connection line, a portion of the coolant line connected to the radiator and a portion of the coolant line connecting the radiator and the reservoir tank are closed through operation of the first valve, and the coolant passing through the at least one electrical component is supplied to the chiller along the opened connection line without passage through the radiator through operation of the first water pump;
in the battery cooling apparatus, the branch line and the battery coolant line are opened through operation of the second valve, respectively, and the coolant passing through the battery module is supplied to the chiller along the branch line through operation of the second water pump;
the coolant line and the heating line respectively form an independent closed circuit through operation of the third valve;
in the heating apparatus, the coolant circulates along the heating line through operation of the third water pump;
in the air conditioner, the refrigerant line connecting the condenser and the evaporator is closed through operation of the first expansion valve;
the refrigerant connection line is opened through operation of the second expansion valve;
the second expansion valve expands the refrigerant supplied to the refrigerant connection line to be supplied to the chiller;
the third expansion valve expands the refrigerant supplied from the condenser to be supplied to the heat exchanger; and
the gas injection unit is operated.

16. The heat pump system for the vehicle of claim 4, wherein
in the heating/dehumidification mode of the vehicle,
the connection line is opened through an operation of the first valve;
in the cooling apparatus, on a basis of the connection line, a portion of the coolant line connected to the radiator and a portion of the coolant line connecting the radiator and the reservoir tank are closed through operation of the first valve, and the coolant passing through the at least one electrical component is supplied to the chiller along the opened connection line without passage through the radiator through operation of the first water pump;
in the battery cooling apparatus, the branch line is opened through an operation of the second valve to close the battery coolant line except a portion of the battery coolant line connected to the reservoir tank with respect to the branch line;
the coolant discharged from the chiller is introduced into the reservoir tank through the branch line and the opened the battery coolant line;
the coolant line and the heating line respectively form an independent closed circuit through operation of the third valve;
in the heating apparatus, the coolant circulates along the heating line through operation of the third water pump;
in the air conditioner, the refrigerant is circulated along the refrigerant line and the refrigerant connection line opened through operation of the first and second expansion valves, respectively;
the first and second expansion valves expand the refrigerant so that the expanded refrigerant is respectively supplied to the evaporator and the chiller; and
the gas injection unit is operated.

17. The heat pump system for the vehicle of claim 1, wherein
when cooling the at least one electrical component and the battery module by use of the coolant,
the connection line and the branch line are closed through operation of the first and second valves,
the coolant cooled in the radiator and stored in the reservoir tank, is supplied to the at least one electrical component through operation of the first water pump, and
the coolant stored in the reservoir tank is circulated in the battery coolant line connected to the reservoir tank through operation of the second valve to be supplied to the battery module.

18. The heat pump system for the vehicle of claim 1, wherein when using waste heat of the at least one electrical equipment in a heating mode of the vehicle without the operation of the air conditioner, the connection line is opened through an operation of the first valve;

in the cooling apparatus, on a basis of the connection line, a portion of the coolant line connected to the radiator and a portion of the coolant line connecting the radiator and the reservoir tank are closed;

the branch line is opened through an operation of the second valve to close the battery coolant line except a portion of the battery coolant line connected to the reservoir tank with respect to the branch line;

the coolant whose the temperature is increased while passing through the at least one electrical component by the operation of the first water pump is supplied to the heater along the heating line connected through the third valve without passing through the radiator;

the coolant discharged from the heater is supplied into the chiller along the heating line, the third valve, the coolant line, the connection line, and the branch line; and the coolant discharged from the chiller is introduced into the reservoir tank through the branch line and the opened battery coolant line.

19. The heat pump system for the vehicle of claim 18, wherein the first valve is configured to open the coolant line connected to the radiator to allow a portion of the coolant passing through the at least one electrical component to flow into the connection line and the remaining coolant to flow into the radiator when the at least one electrical component is overheated.

20. The heat pump system for the vehicle of claim 1, wherein the gas injection unit is configured to be operated in a heating mode or a heating/dehumidification mode of the vehicle.

* * * * *